United States Patent
Ramakrishnan et al.

(10) Patent No.: US 11,304,042 B1
(45) Date of Patent: Apr. 12, 2022

(54) MULTI-BLUETOOTH RADIO DEVICE

(71) Applicant: Amazon Technologies, Inc., Seattle, WA (US)

(72) Inventors: Sameet Ramakrishnan, Saratoga, CA (US); Ravi Ichapurapu, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 16/654,789

(22) Filed: Oct. 16, 2019

(51) Int. Cl.
 *H04W 4/80* (2018.01)
 *H04W 72/04* (2009.01)
 *H04W 4/48* (2018.01)
 *H04J 3/06* (2006.01)
 *H04B 1/713* (2011.01)

(52) U.S. Cl.
 CPC .............. *H04W 4/80* (2018.02); *H04B 1/713* (2013.01); *H04J 3/0658* (2013.01); *H04W 4/48* (2018.02); *H04W 72/0446* (2013.01)

(58) Field of Classification Search
 CPC ..... H04W 4/80; H04W 72/0446; H04W 4/48; H04J 3/0658; H04B 1/713
 See application file for complete search history.

(56) References Cited

U.S. PATENT DOCUMENTS

| | | | |
|---|---|---|---|
| 9,820,323 B1* | 11/2017 | Young | H04B 1/385 |
| 10,681,479 B2* | 6/2020 | Zhao | H04W 4/80 |
| 11,013,062 B2* | 5/2021 | Srivastava | H04W 4/80 |
| 2016/0227319 A1* | 8/2016 | Zhao | H04R 27/00 |
| 2016/0286337 A1* | 9/2016 | Thekkedathu Sivaraman | H04L 65/4092 |
| 2019/0223192 A1* | 7/2019 | Linsky | H04R 1/1041 |
| 2019/0393932 A1* | 12/2019 | Hsu | H04B 1/713 |

* cited by examiner

*Primary Examiner* — Habte Mered
(74) *Attorney, Agent, or Firm* — Kilpatrick Townsend & Stockton LLP

(57) ABSTRACT

A multi-Bluetooth radio device is described. In an example, the device includes a first Bluetooth radio storing first instructions that, upon execution on the first Bluetooth radio, configure the first Bluetooth radio to perform first operations. The first operations include establishing a first communication link with a first device and receiving, over the first communication link, an audio packet from the first device. The device also includes a second Bluetooth radio storing second instructions that, upon execution on the second Bluetooth radio, configure the second Bluetooth radio to perform second operations. The second operations include establishing a second communication link with a second device and transmitting, over the second communication link, the audio packet to the second device.

20 Claims, 16 Drawing Sheets

MULTI-BLUETOOTH RADIO DEVICE

BACKGROUND

Bluetooth is a wireless technology standard for exchanging data between devices over short distances using frequency bands between 2.4 GHz and 2.485 GHz. In a typical Bluetooth configuration, a primary device establishes a Bluetooth connection with a secondary device, where the primary device has various controls over various aspects of the Bluetooth connection.

For example, a vehicle can include a Bluetooth-compatible speaker. When placed in the vehicle, a mobile device of a user may connect with the Bluetooth-compatible speaker. The mobile device and the Bluetooth-compatible speaker are typically set up as a primary device and a secondary device, respectively. The mobile device may relay a music stream from a content server to the Bluetooth-compatible speaker such that music is played over the Bluetooth-compatible speaker. For an ongoing cellular call, an audio output may be relayed from the mobile device and played over the Bluetooth-compatible speaker and an audio input may be detected by a microphone of the Bluetooth-compatible speaker and relayed to the mobile device for transmission.

BRIEF DESCRIPTION OF THE DRAWINGS

Various embodiments in accordance with the present disclosure will be described with reference to the drawings, in which.

DETAILED DESCRIPTION

Figure 1:
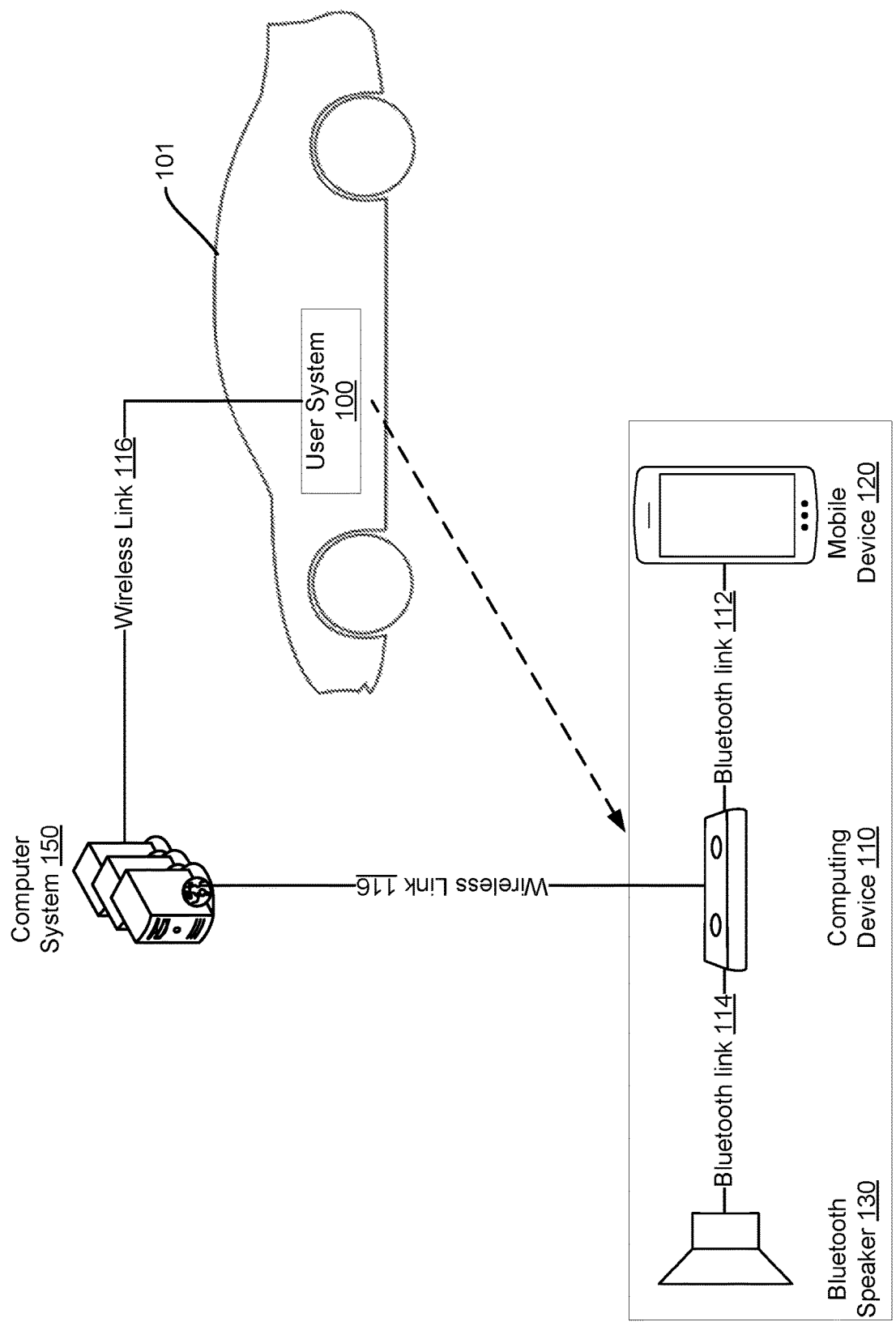
FIG. 1 illustrates a user system within a vehicle, where the user system includes a computing device, a mobile device, and a Bluetooth speaker, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, data communications using a plurality of radios. In an example, a computing device includes a first Bluetooth radio, a second Bluetooth radio, and a third wireless radio (e.g., a cellular radio). The third wireless radio allows data communications between the computing device and a remote computer system. The remote computer system can be a cloud-based system that provides various computing services including communications, media streaming, querying, personal assistance, etc. The computing devices can be paired to a first device based on the first Bluetooth radio and to a second device based on the second Bluetooth radio according to the Bluetooth protocol. The pairing allows the computing device to establish a first Bluetooth link with the first device and a second Bluetooth link with the second device. Generally, the Bluetooth links can be of a same type (e.g., both are extended Synchronous Connection Oriented (eSCO) links, asynchronous connection-less (ACL) links, etc.) and can support synchronous communications (e.g., for voice-based applications) or asynchronous communications (e.g., for music-based application). In this way, the computing device can be set-up as a Bluetooth bridge that relays packets between the first device and the second device over the Bluetooth links. As needed, the computing device can also relay packets received over the third wireless radio from the remote computer system to the first device and/or the second device over the Bluetooth links.

To illustrate, consider an example of a data communications to occur in a vehicle. The vehicle can include a computing device configured according to embodiments of the present disclosure, and a Bluetooth speaker. A user may bring their mobile device to the vehicle. The computing device can be paired with the Bluetooth speaker and with the mobile device. In particular, the computing device establishes a first eSCO link with the mobile device and a second eSCO link with the Bluetooth speaker, and a first ACL link with the mobile device and a second ACL link with the Bluetooth speaker. Upon a user utterance for streaming music (e.g., "Alexa, play music"), the computing device can detect a wakeword (e.g., "Alexa") and send an audio message that represents the user utterance (e.g., "play music") to a remote computer system via a cellular radio of the computing device. In response, the remote computer system can start a music stream to the computing device and the computing device relays the music stream as audio packets over the second ACL link to the Bluetooth speaker. Accordingly, music can be played over the Bluetooth speaker of the vehicle. In addition, the mobile device can include a native or third party phone call application. When a phone call is placed or received, incoming audio packets are sent to the computing device over the first eSCO link and forwarded to the Bluetooth speaker over the second eSCO link such that incoming voice is played over the Bluetooth speaker. Conversely, outgoing audio packets corresponding to user utterances in the vehicle are sent from the Bluetooth speaker (e.g., one that includes a microphone) to the computing device over the second eSCO link and forwarded to the mobile device over the eSCO link for transmission from the mobile device.

Embodiments of the present disclosure provide several technical advantages over existing Bluetooth-compatible devices. For example, in existing systems, to access computing services of a remote computer system, a computing device (e.g., a computing device in a vehicle) needs to relay data over a Bluetooth link to another device (e.g., the mobile phone) that then forwards it to the remote computer system. In contrast, by using a third wireless radio (such as a cellular radio), the availability of the computing services no longer depends on the Bluetooth link and, therefore, an application or an operating system of the other device (e.g., the mobile phone) can no longer interrupt the availability of the computing services via the computing device. In another example, a computing device configured according to embodiments of the present disclosure can include a memory shared between its Bluetooth radios. In this way, packets received by one Bluetooth radio can be stored in the memory and accessed by the other Bluetooth radio for transmission, thereby reducing the latency of forwarding the packets. In addition, the received packets may have been encoded according to a codec. However, the encoding is not altered when the packets are stored nor when the packets are transmitted, thereby further reducing the latency. In a further example, because multiple Bluetooth radios are within a short distance from each other in the computing device, radio frequency (RF) interference may occur. In particular, if one of the Bluetooth radios is transmitting and the other Bluetooth radio is receiving, the transmission may RF interfere with the reception. To reduce or eliminate the RF interference, transmission and reception operations of the Bluetooth radios are time synchronized. In particular, the two Bluetooth radios can only transmit synchronously and can only receive synchronously when bidirectional communications are needed. These and other technical advantages are further described in connection with the next figures.

FIG. 1 illustrates a user system 100 within a vehicle 101, where the user system 100 includes a computing device 110, a mobile device 120, and a Bluetooth speaker 130, according to embodiments of the present disclosure. Bluetooth links 112 and 114 exist between the computing device 110 and the mobile device 120 and the Bluetooth speaker 130. In addition, a wireless link 126 exists between the user system 100 (in particular the computing device 110) and a remote computer system 150. The wireless link 126 can be a cellular link, a Wi-Fi link (e.g., to a wireless hot spot in the vehicle 101) or any other type of data communications link that facilitates the transmission and reception of data between the user system 100 and the remote computer system 150. The Bluetooth links 112 and 114 and the supporting the wireless link 116 allows the computing device 110 to provide various services to a user of the vehicle 101 (e.g., a driver and/or a passenger).

In an example, the computing device 110 is a voice-controller device (VCD) that includes a microphone(s), a speaker(s), and/or other user interfaces. Generally, the VCD hosts an intelligent personal assistant service responsive to a wakeword (e.g. "Alexa") and capable of different computing tasks in response to utterances of the user (e.g., "Alexa, play music"). The term "wakeword" may correspond to a "keyword" or "key phrase," an "activation word" or "activation words," or a "trigger," "trigger word," or "trigger expression." One exemplary wakeword may be a name, such as the name, "Alexa," however it will be recognized that any word (e.g., "Amazon"), or series of words (e.g., "Wake Up" or "Hello, Alexa") may alternatively be used as the wakeword.

Upon detecting the wakeword, the VCD may package and send audio data (e.g., "play music") representing the utterance to the computer system 150 via a wireless radio of the VCD providing the wireless link 126. In turn, the computer system 150 includes a language processing system that applies automatic speech recognition (ASR) processing to the audio data to generate text data and applies natural language understanding (NLU) processing to the text data in order to determine the intent of the utterance, which can be provided as intent data. Given the intent data, the computer system 150 may initiate a response (e.g., start a music session by instructing the VCD to establish a communications session over the wireless link 126 with a content server) and provide data (e.g., commands and/or content) to the VCD. The VCD can then present aspects of the response (e.g., present music) locally at a user interface of the VCD and/or via the mobile device 120 and/or the Bluetooth speaker 130. The VCD can be mobile (e.g., placed and/or removed) by the user and/or a trained person or can be stationary (e.g., installed in the vehicle 101 or integrated within another system of the vehicle 101, such as within an infotainment system).

The mobile device 120 is an example of a first device that can be paired with the computing device 110. Generally, the first device can be any suitable user device that includes a processor, a memory, a microphone, a speaker, and a Bluetooth radio having a Bluetooth connectivity chip (e.g., a microcontroller, a transmitter, and a receiver) and an application layer that are compliant with the Bluetooth protocol. In addition to a mobile device, the first device can be a tablet, a laptop, a personal electronic device (PED).

The Bluetooth speaker 130 is an example of a second device that can be paired with the computing device 110. Generally, the second device can be any suitable user device that includes a processor, a memory, a microphone, a speaker, and a Bluetooth radio having a Bluetooth connectivity chip (e.g., a microcontroller, a transmitter, and a receiver) and an application layer that are compliant with the Bluetooth protocol. The second device can be stationary (e.g., installed in the vehicle 101 or integrated within another system of the vehicle 101, such as within the infotainment system) or can be mobile (e.g., can be placed and/or removed) by the user and/or a trained person.

Different types of services are available to the user via the user system 100 based on the Bluetooth links 112 and 114 and the wireless link 126. For instance, the user can submit queries, stream music, and/or place a call by making utterances, whereby the computing device 110 may detect the utterances, send a request to the computer system 150, and play a response from the computer system 150 locally or via the Bluetooth speaker 130. The user can also operate the mobile device to launch native or third party applications, where user interactions with and presentations of content from the native or third party applications can occur via the Bluetooth speaker 130 and/or the computing device 110. Examples of providing phone services and music services are further illustrated in FIGS. 2 and 3, respectively.

Figure 2:
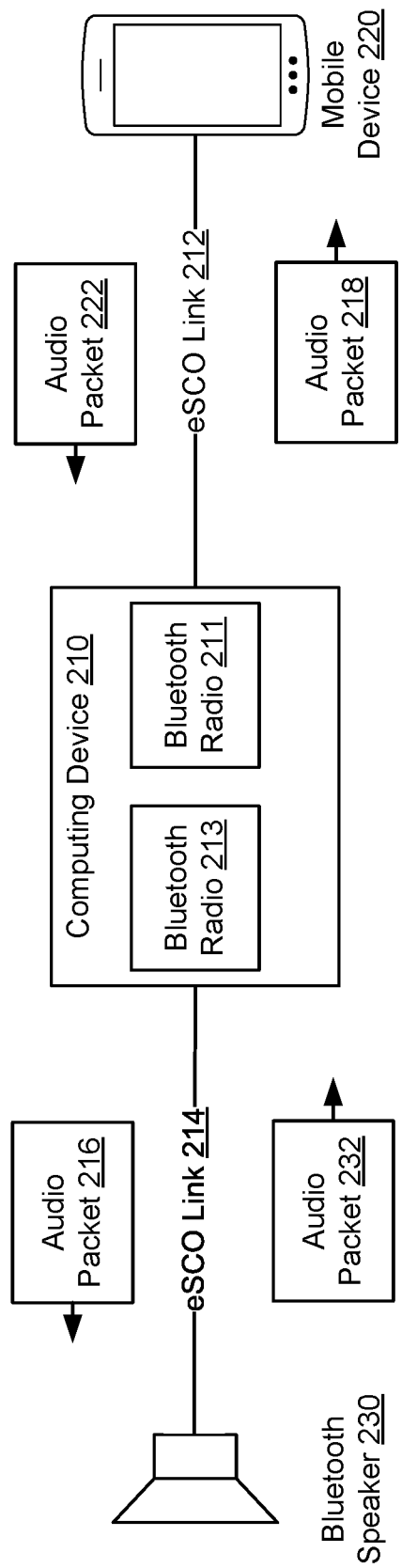
FIG. 2 illustrates an example computing device that includes two Bluetooth radios for voice communications, according to embodiments of the present disclosure.

FIG. 2 illustrates an example computing device 210 that includes two Bluetooth radios 211 and 213 for voice communications, according to embodiments of the present disclosure. As illustrated, the computing device 210 is paired to a mobile device 220 and a Bluetooth speaker 230. The mobile device 220 may execute a native or a third party communications application to establish a communications session with another user device (not shown). An audio output (e.g., audio received from the other user device in the communications session) from the mobile device 220 is transmitted to the computing device 210 that forwards it to the Bluetooth speaker 230 for presentation thereat. An audio input (e.g., audio corresponding to utterances of the user of the mobile device 210) is transmitted from the Bluetooth speaker 230 (e.g., upon detection of the utterances by a microphone of the Bluetooth speaker 230) to the computing device 210 that forwards it to the mobile device 220 for transmission to the other user device. The computing device 210, the mobile device 220, and the Bluetooth speaker 230 are examples of the computing device 110, the mobile device 120, and the Bluetooth speaker 130 of FIG. 1, respectively.

In an example, the pairing allows the computing device 210 to establish a first eSCO link 212 with the mobile device 220. In particular, the first eSCO link 212 is established between the first Bluetooth radio 211 and the mobile device 220, where the mobile device 220 is a primary device, whereas the computing device 210 is a secondary device. Likewise, the pairing allows the computing device 210 to establish a second eSCO link 214 with the Bluetooth speaker 230. In particular, the second eSCO link 214 is established between the second Bluetooth radio 213 and the Bluetooth speaker 230, where the computing device 210 is a primary device, whereas the Bluetooth speaker 230 is a secondary device. Accordingly, the computing device 210 acts as a secondary device in association with the first eSCO link 212 and as the primary device in connection with the second eSCO link 214. Primary device and secondary device may be referred to as master and slave, respectively, in the industry.

A first audio packet 222 is transmitted from the mobile device 220 (e.g., based on the execution of the native or third party communications application) and received by the first Bluetooth radio 211 over the first eSCO link 212. The second Bluetooth radio 213 transmits the first audio packet 222 as the audio packet 216 over the second eSCO link 214 to the Bluetooth speaker 230. Similarly, a second audio packet 232 is transmitted from the Bluetooth speaker 230 and received by the second Bluetooth radio 213 over the second eSCO link 214. The first Bluetooth radio 211 transmits the second audio packet 232 as the audio packet 218 over the first eSCO link 214 to the mobile device 220.

To reduce or eliminate RF interference between the Bluetooth radios 211 and 213, the transmissions of the audio packet 216 and audio packet 218 are time synchronized with each other. Similarly, the receptions of the first audio packet 222 and the second audio packet 232 are time synchronized with each other. In other words, the Bluetooth radios 211 and 213 transmit at the same time and receive at the same time. Examples for the synchronous transmissions and the synchronous receptions are further illustrated in FIGS. 5 and 6.

To reduce the latency associated between the time a packet is received and the time the packet is transmitted, the Bluetooth radios 211 and 213 use a shared memory of the computing device 210. For instance, the first Bluetooth radio 211 stores the first audio packet 222 in the shared memory. The second Bluetooth radio 213 accesses the first audio packet 222 from the shared memory and transmits it as the audio packet 216. In addition, the latency can be further reduced by avoiding any re-encoding of a received packet. For instance, the mobile device 220 encodes audio output with a codec (e.g., modified sub band coding (mSBC)) prior to transmission to the computing device 210, such that the first Bluetooth radio 211 receives the audio packet 222 as having been encoded with the codec. Rather than decoding the audio packet 222 and/or encoding (re-encoding) it with another codec, the first Bluetooth radio 211 stores the audio packet 222 in the received encoded format. Likewise, rather than decoding the audio packet 222 and/or encoding (re-encoding) it with another codec, the second Bluetooth radio 213 transmits the audio packet 222 in the received encoded format.

In an example, the computing device 210 also includes a wireless radio (not shown) that establishes a communications link (e.g., including at least in part a wireless link) with a remote computer system (e.g., the remote computer system 150 of FIG. 1). During the phone call, and while the computing device 210 is relaying audio packets between the mobile device 220 and the Bluetooth speaker 230, a microphone (not shown) of the computing device 210 may receive a user utterance related to a computing service available from the remote computer system (e.g., "Alexa, what time is it"). Upon detection of the relevant wakeword, transmission of audio data to the remote computer system, and receipt of a response from the computer system (e.g., "time=5:40 pm"), the computing device may present aspects of the response (e.g., may play a text-to-speech (TTS) message that "the time is 5:40 pm"). The presentation may be carried over a speaker (not shown) of the computing device 210 or may be transmitted to the Bluetooth speaker 230 over a different Bluetooth link (e.g., an ACL link) for presentation by the Bluetooth speaker. In addition, transmissions of audio packets over the first eSCO link 212 to the mobile device 220 may be paused anytime between the user utterance is detected and the end of the presentation of the response. In this way, the mobile device 220 may not transmit some or all of the user utterance and/or some or all aspects of the response (e.g., the TTS message) to the other user device.

Figure 3:
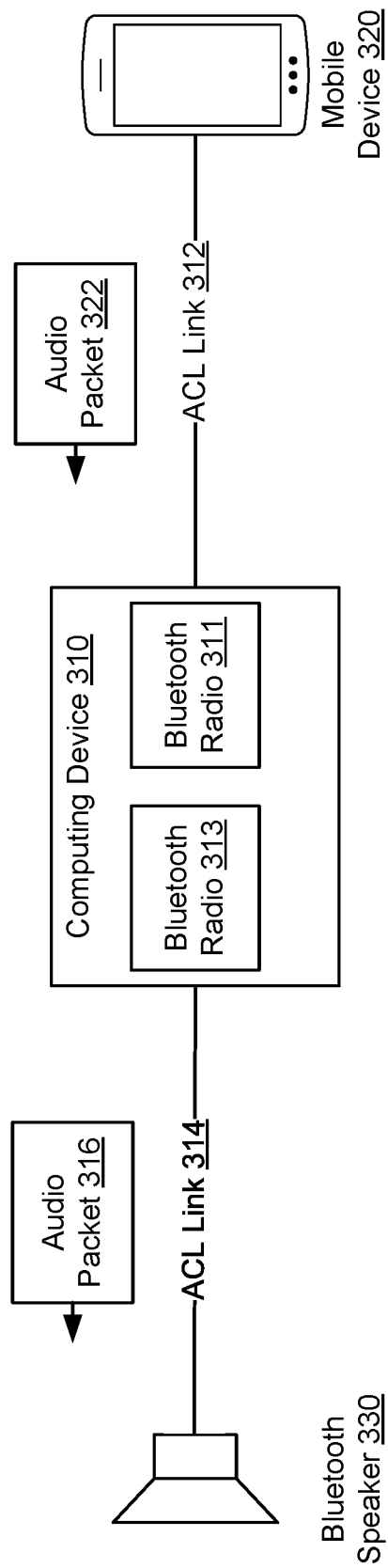
FIG. 3 illustrates an example computing device that includes two Bluetooth radios for content streaming, according to embodiments of the present disclosure.

FIG. 3 illustrates an example computing device 310 that includes two Bluetooth radios 311 and 313 for content streaming, according to embodiments of the present disclosure. As illustrated, the computing device 310 is paired to a mobile device 320 and a Bluetooth speaker 330. The mobile device 320 may execute a native or third party content application (e.g., one for streaming music) to receive content (e.g., stream music) from a remote computer system or from local memory (not shown). Content received by the mobile device 320 is transmitted to the computing device 310 that forwards it to the Bluetooth speaker 330 for presentation thereat. The computing device 310, the mobile device 320, and the Bluetooth speaker 330 are examples of the computing device 110, the mobile device 120, and the Bluetooth speaker 130 of FIG. 1, respectively.

In an example, the pairing allows the computing device 310 to establish a first ACL link 312 with the mobile device 320. In particular, the first ACL link 312 is established between the first Bluetooth radio 311 and the mobile device 320, where the mobile device 320 is a primary device, whereas the computing device 310 is a secondary device. Likewise, the pairing allows the computing device 310 to establish a second ACL link 314 with the Bluetooth speaker 330. In particular, the second ACL link 314 is established between the second Bluetooth radio 313 and the Bluetooth speaker 330, where the computing device 310 is a primary device, whereas the Bluetooth speaker 330 is a secondary device. Accordingly, the computing device 310 acts as a secondary device in association with the first ACL link 312 and as the primary device in connection with the second ACL link 314.

An audio packet 322 is transmitted from the mobile device 320 (e.g., based on the execution of the native or third party content application) and received by the first Bluetooth radio 311 over the first ACL link 312. The second Bluetooth radio 313 transmits the audio packet 322 as the audio packet 316 over the second ACL link 314 to the Bluetooth speaker 330.

To reduce or eliminate RF interference between the Bluetooth radios 311 and 313, transmission and reception operations of the Bluetooth radios 311 and 313 are time synchronized with each other. In particular, while the first Bluetooth radio 311 is receiving one or more audio packets from the mobile device 320, the second Bluetooth radio 313 may not transmit audio packets. Similarly, when the second Bluetooth radio 313 is transmitting one or more audio packets to the Bluetooth speaker 330, the first Bluetooth radio 311 may not receive audio packets. In other words, the computing device 310 switches between a reception mode and a transmission mode in a non-overlapping manner. In the reception mode, the first Bluetooth radio 311 receives audio packets over the first ACL link 312, but the second Bluetooth radio 313 does not transmit audio packets over the second ACL link 314. In the transmission mode, the second Bluetooth radio 313 transmits audio packets over the second ACL link 314, but the first Bluetooth radio 311 does not receive audio packets over the first ACL link 312.

To reduce the latency associated between the time a packet is received and the time the packet is transmitted, the Bluetooth radios 311 and 313 use a shared memory of the computing device 310. For instance, the first Bluetooth radio 311 stores the audio packet 322 in the shared memory. The second Bluetooth radio 313 accesses the audio packet 322 from the shared memory and transmits it as the audio packet 316. In addition, the latency can be further reduced by avoiding any re-encoding of a received packet. For instance, the mobile device 320 encodes audio output with a codec (e.g., moving picture experts group-4 (MPEG-4)) prior to transmission to the computing device 310, such that the first Bluetooth radio 311 receives the audio packet 322 as having been encoded with the codec. Rather than decoding the audio packet 322 and/or encoding (re-encoding) it with another codec, the first Bluetooth radio 311 stores the audio packet 322 in the received encoded format. Likewise, rather than decoding the audio packet 322 and/or encoding (re-encoding) it with another codec, the second Bluetooth radio 313 transmits the audio packet 322 in the received encoded format.

As further illustrated in connection with FIGS. 9-11, multiple audio packets may be received over the first ACL link 312 and stored in the shared memory prior to transmission over the second ACL link 314. In this case, the second Bluetooth radio 313 may re-packetize the stored audio packets without changing their codec. Generally, an audio packet according to the Bluetooth protocol includes a payload (e.g., the actual audio data encoded according to a codec), in addition to an access code and a header. Re-packetizing includes generating a new audio packet that includes the encoded audio data from multiple received audio packets in a single payload, in addition to a single header and a single access code. To illustrate, if the quality of the second ACL link 314 permits longer packets (e.g., 2-DH5) and shorter packets (e.g., 2-DH1 and 2DH-3) were received over the first ACL link 312 and stored in the shared memory, the second Bluetooth radio 313 (or another processor of the computing device 310) can aggregate the shorter packets to form a longer packet (e.g., by aggregating two 2-DH1 packets and one 2-DH3 packet to form one 2-DH5 packet) and can transmit the longer packet (e.g., the 2-DH5 packet) instead of transmitting the shorter packets individually (e.g., the two 2-DH1 packets and the one 2-DH3 packet).

FIG. 3 illustrates content transmission in one direction (e.g., from the mobile device 320 to the Bluetooth speaker 330 via the computing device 310). However, the embodiments of the present disclosure are not limited as such. Instead, the embodiments similarly apply to content transmission in the other direction (e.g., from the Bluetooth speaker 330 to the mobile device 320 via the computing device 310) and bi-directional content transmissions.

Figure 4:
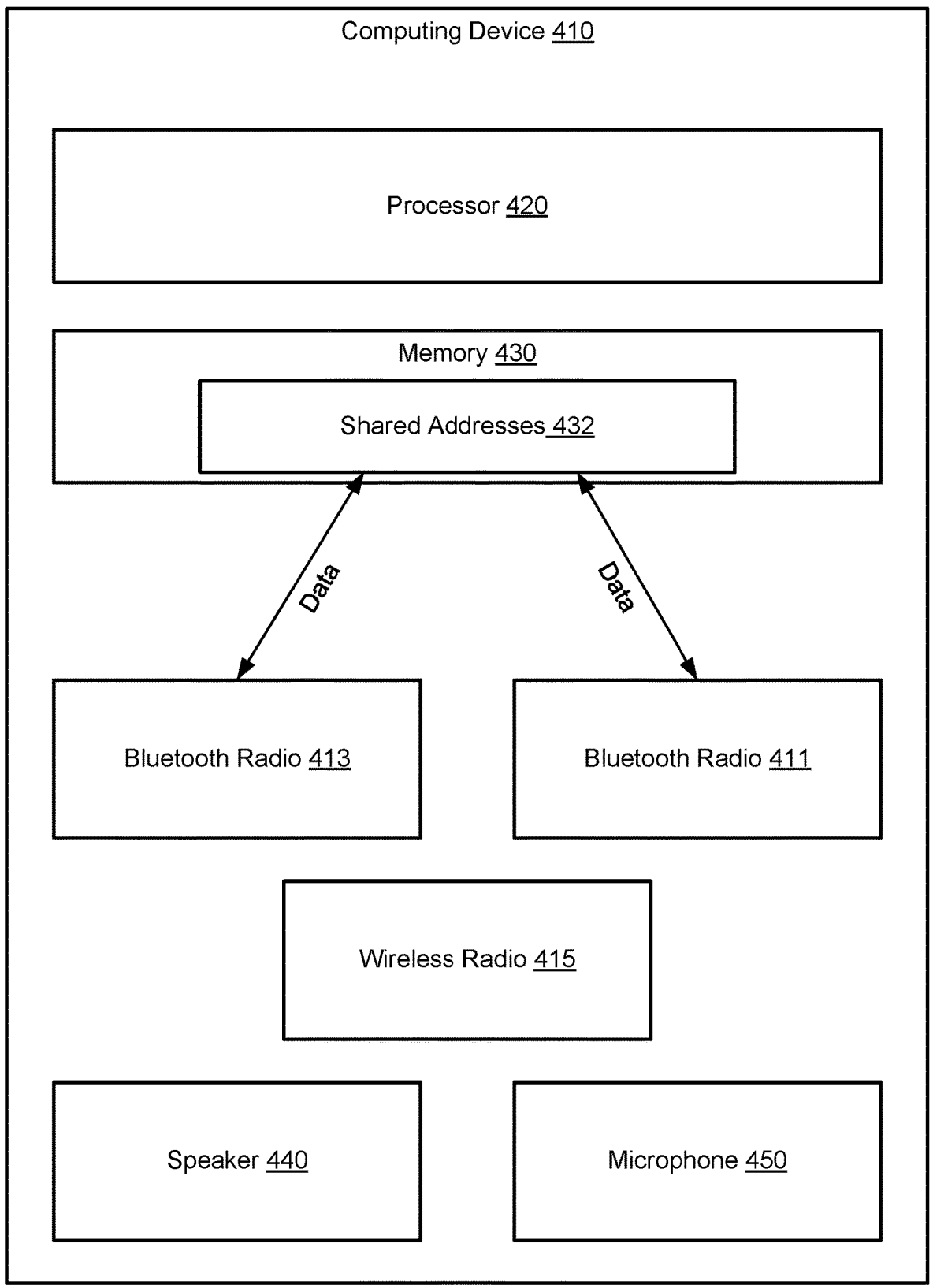
FIG. 4 illustrates an example computing device that includes a plurality of radios, according to embodiments of the present disclosure.

FIG. 4 illustrates an example computing device 410 that includes a plurality of radios, according to embodiments of the present disclosure. The computing device 410 is an example of the computing device 110 of FIG. 1. As illustrated, the computing device 410 includes, among other components, a first Bluetooth radio 411, a second Bluetooth radio 412, a wireless radio 415 (e.g., a cellular radio, a Wi-Fi radio, a Zigbee radio, etc.), a processor 420, a memory 430, a speaker 440, and a microphone 450.

Each of the first Bluetooth radio 411, the second Bluetooth radio 412, the wireless radio 415 include hardware (e.g., circuitry) and software (e.g., an application layer) that implement the relevant communications standard (e.g., Bluetooth protocols for the first Bluetooth radio 411 and the second Bluetooth radio 412 and Long-Term Evolution (LTE) protocols or other cellular protocols for a cellular radio). The hardware includes a connectivity chip (e.g., a microcontroller having a processor and a memory, a scheduler, a digital signal processor, a filter, an error correction system, etc.), a transmitter and a receiver (or a transceiver), and antenna among other hardware components. In addition, the connectivity chip can include a crystal oscillator for setting a clock of the radio. However, the computing device 410 can include a single crystal oscillator common to the two Bluetooth radio 411 and 415 (and, optionally, common to the wireless radio 415) to more easily allow an alignment of the radio clocks.

The memory 430 includes computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 430 can also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing device 410.

Further, the memory 430 includes an operating system, programs, and applications. The processor 420 is configured to execute the stored instructions and includes, for example, a logical processing unit, a microprocessor, a digital signal processor, and other processing devices.

The speaker 440 represents an output interface, whereas the microphone 450 represents an input interface. As such, the speaker 440 and the microphone 450 are an example of an input/output (I/O) interface available to a user of the computing device 410. In addition, an interface bus (not shown) is configured to communicate, transmit, and transfer data, controls, and commands among the various components of the computing device 410.

In an example, the memory 430 (or a portion thereof) is shared between the two Bluetooth radio 411 and 415 (and, optionally, with the wireless radio 415). In this way, data can be written to and read from the memory 430 (e.g., data packets stored to and accessed from the memory 43) by at least both Bluetooth radios 411 and 415. In other words, data written by the first Bluetooth radio 411 can be read by the second Bluetooth radio 413 and vice versa. Sharing the memory 430 (or the portion thereof) can include using a shared set of addresses 432 (physical addresses and, optionally, logical addresses that can be mapped to the same physical addresses) between the relevant radios.

Figure 5:
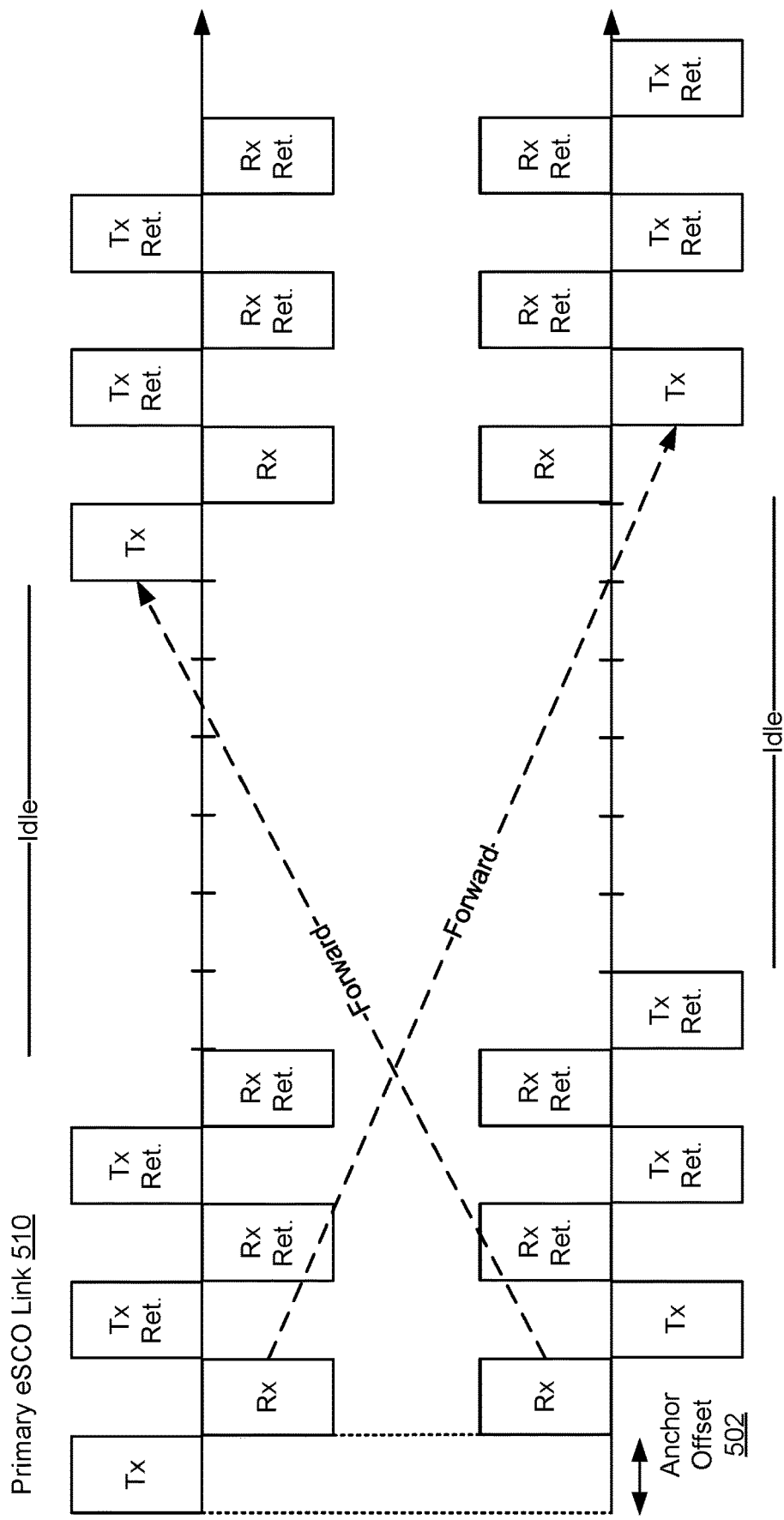
FIG. 5 illustrates an example diagram for synchronous audio communications, according to embodiments of the present disclosure.

FIG. 5 illustrates an example diagram for synchronous audio communications, according to embodiments of the present disclosure. In an example, a computing device includes a plurality of Bluetooth radios. A first Bluetooth radio of the computing device establishes a first eSCO link with a first device. The first device is a primary device that manages a first piconet. The first Bluetooth radio is a secondary device in the first piconet. A second Bluetooth radio of the computing device establishes a second eSCO link with a second device. The first Bluetooth radio is a primary device that manages a second piconet. The second device is a secondary device in the second piconet. Synchronous transmissions and synchronous receptions are performed over the two eSCO links. In FIG. 5, the second eSCO link (where the computing device is a primary) and the first eSCO link (where the computing device is a secondary) are illustrated as a primary eSCO link 510 and a secondary eSCO link 550, respectively.

In an illustration, assume that eSCO allows a maximum of two slots transmission every twelve slots and two retransmission attempts. The slot timing of the primary eSCO link 510 is synchronized to the slot time of the secondary primary eSCO link 550 (time synchronizing the secondary primary eSCO link 550 to the primary eSCO link 510 may not be possible because the first device, rather than the computing device, is the primary device in the first piconet). The synchronization can be accomplished by having a scheduler that controls timing of both eSCO links, such that the timing of the second Bluetooth radio (being a primary device) tracks the timing of the first Bluetooth device (being a secondary device). The primary eSCO link's 510 timing is pushed so as to not interfere with the secondary eSCO link 520.

In particular and as illustrated in FIG. 5, in a twelve time slot window, the primary eSCO link 510 allows a transmission (Tx) in a time slot, followed by a reception (Rx) in a next time slot, and thereafter allows two transmission retries (Tx retries) and two reception retries (Rx retries), before idling in six time slots. Similarly, the secondary eSCO link 550 allows a transmission (Tx) in a time slot, followed by a reception (Rx) in a next time slot, and thereafter allows two transmission retries (Tx retries) and two reception retries (Rx retries), before idling in six time slots.

An anchor offset 502 is used before the first reception time slot in the primary eSCO link 510, such that the first reception time slot occurs in parallel (e.g., is synchronous) with the first reception time slot in the secondary eSCO link 550. The end of the anchor offset 502 is an anchor point. The length of the anchor offset can correspond to one time slot, as illustrated in FIG. 5. The anchor point indicates a start of a time slot for a connection event, where the connection event can be a transmission or a reception of a set of audio packets. In other words, a Bluetooth radio starts transmitting the set of audio packets or starts receiving the set of audio packets in the time slot indicated by the anchor point. A time slot used for transmitting an audio packet may be referred to herein as a transmission time slot. A time slot used for receiving an audio packet may be referred to herein as a reception time slot.

Once the time slots are synchronized, reception and transmission of audio packets can occur. For instance, upon the second Bluetooth radio receiving an audio packet in the first reception time slot over the primary eSCO link 510, the first Bluetooth radio can transmit the audio packet in the first transmit time slot in the next twelve slot time window over the secondary eSCO link 550 (as illustrated with the dashed arrow pointed diagonally downward and labeled "forward" in FIG. 5; the label "forward" is used to indicate that the first Bluetooth radio accesses the audio packet from a memory shared with the second Bluetooth radio). Similarly, upon the first Bluetooth radio receiving an audio packet in the first reception time slot over the secondary eSCO link 550, the second Bluetooth radio can transmit the audio packet in the first transmit time slot in the next twelve slot time window over the primary eSCO link 510 (as illustrated with the dashed arrow pointed diagonally upward and labeled "forward" in FIG. 5; the label "forward" is used to indicate that the second Bluetooth radio accesses the audio packet from the memory shared with the first Bluetooth radio).

Of course, the receipt of an audio packet can fail in a receipt time slot. In this case, the audio packet may be received in one of the receipt retry time slots. Further, upon receipt of an audio packet by one Bluetooth radio, that audio packet can be forwarded immediately to the other Bluetooth radio or the forwarding can occur just before the first idle time slot. Here, forwarded is used to indicate that the former Bluetooth radio can indicate to the latter Bluetooth radio (e.g., via a message over an interface bus) that the audio packet is available from the shared memory or the latter Bluetooth radio checking the availability of the audio packet from the shared memory absent such an indication.

Figure 6:
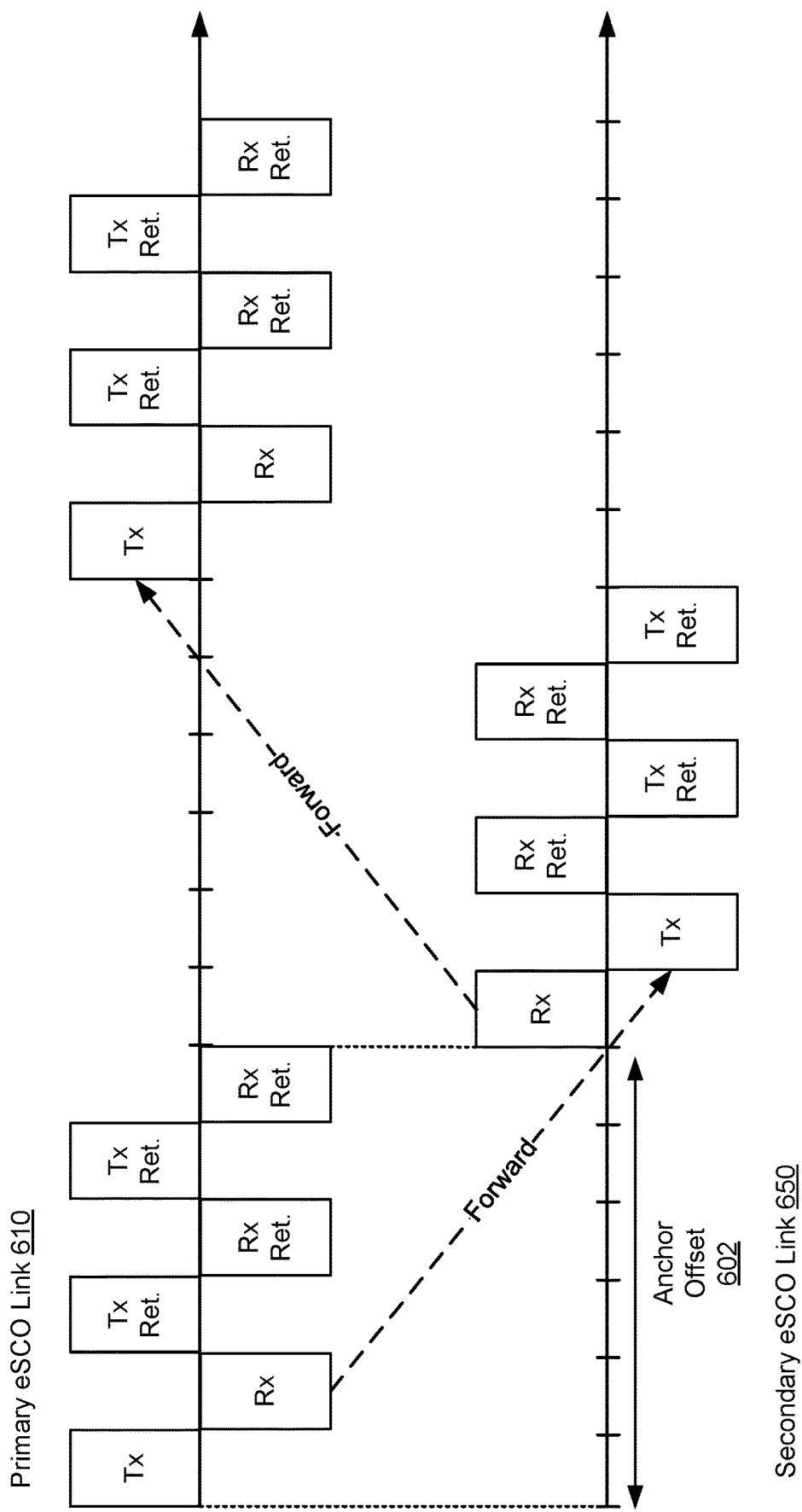
FIG. 6 illustrates another example diagram for synchronous audio communications, according to embodiments of the present disclosure.

FIG. 6 illustrates another example diagram for synchronous audio communications, according to embodiments of the present disclosure. A primary eSCO link 610 and a secondary eSCO link 650 are established, similarly to the primary eSCO link 510 and the secondary eSCO link 550 of FIG. 5. In the interest of brevity, the similarities are not repeated herein, but the description of FIG. 5 applies herein. In comparison to FIG. 5, a longer anchor offset 602 is used. In particular, the anchor offset 602 is equal to six time slots. In other words, the transmission, reception, and retries over the second eSCO link 650 occur during the idle window of the primary eSCO link 610 (e.g., the time window that includes the next six time slots after the first six Tx, Rx, Tx retry, and Rx time slots). Accordingly, when both eSCO links 610 and 650 are considered together, transmission and reception operations occur during the twelve time slot window and no time slot within this window is idle. Hence, the time synchronization of FIG. 6 necessitates one-hundred percent airtime utilization (e.g., all time slots within a transmit and receipt cycle that corresponds to the twelve time slot window are reserved for either Tx, Rx, Tx retry, and Rx time slots).

By comparing the time synchronizations of FIGS. 5 and 6, it can be seen that the time synchronization of FIG. 5 is more airtime efficient. Nonetheless, the time synchronization of FIG. 6 can be more robust when a high packet error rate (PER) is present (e.g., a PER that exceeds a predefined threshold). Accordingly, the computing device can switch between the time synchronizations depending on the PER (or other wireless conditions that can impact the quality of the links). In this case, the computing device (e.g., its processor executing the relevant computer-readable instructions) can compute the airtime by determining a number of time slots used for transmissions and receptions of audio packets within a transmit and receipt cycle (e.g., airtime), comparing the number to a predefined number of time slots (e.g., a predefined threshold), and, if the number exceeds the predefined number, setting the anchor point based on the PER (e.g., increasing the anchor offset to the maximum offset—e.g., the six time slots as illustrated in FIG. 6—when the PER is high). Of course other increments of the anchor offset (e.g., to set the anchor point) are possible, including an increment by odd numbers up to the maxim offset (e.g., one, three, and five; an odd number is needed such that Rx time slots remain synchronous and Tx time slots remain synchronous across the primary and secondary eSCO links).

Figure 7:
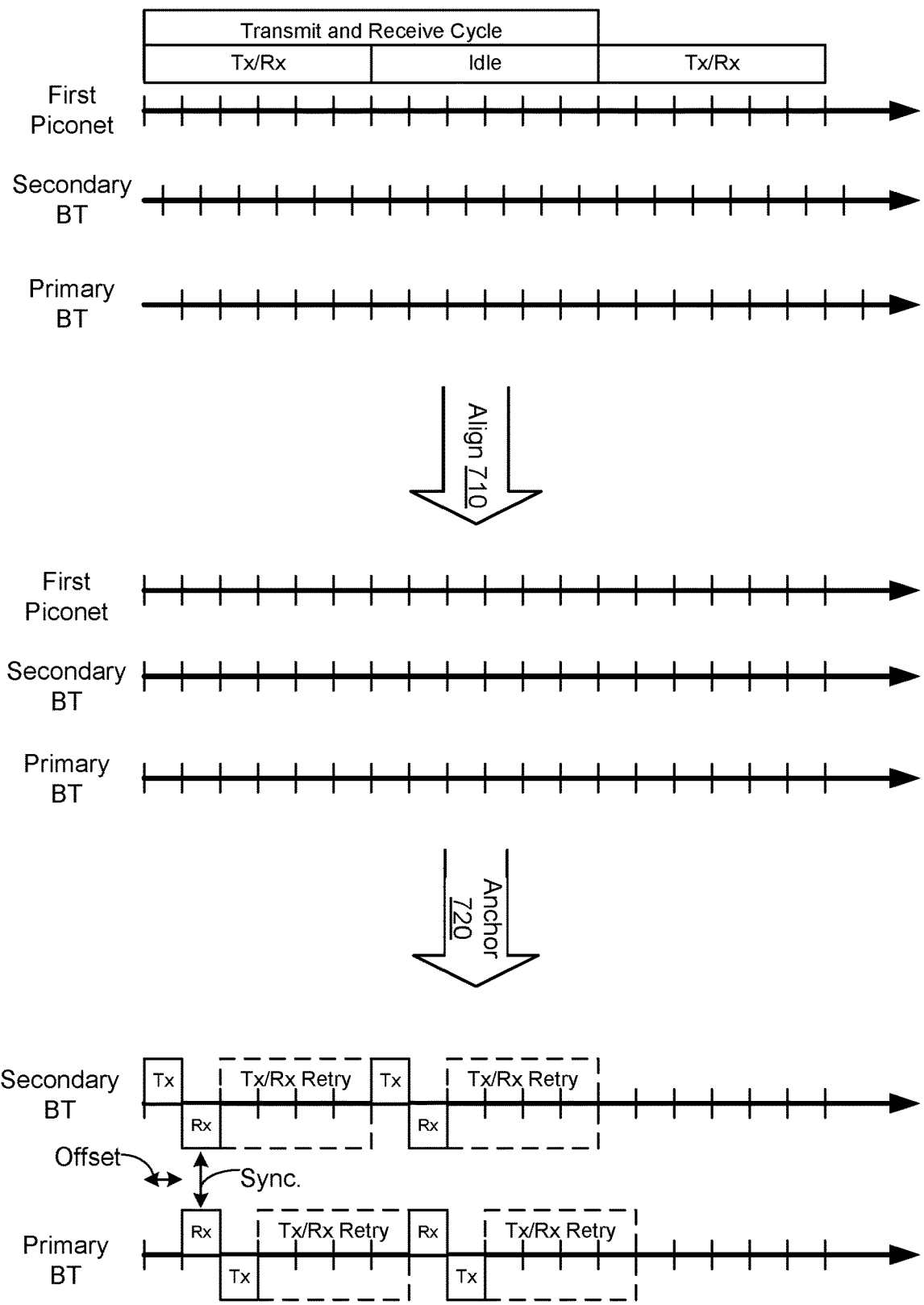
FIG. 7 illustrates an example diagram for aligning and anchoring time slots, according to embodiments of the present disclosure.

FIG. 7 illustrates an example diagram for aligning 710 and anchoring 720 time slots, according to embodiments of the present disclosure. In particular, the aligning 710 and the anchoring 720 allow to achieve any of the time synchronizations illustrated in FIGS. 5-6. The description herein also refers to the computing device having the first and second Bluetooth radios, the first device managing the first piconet, the second device being a secondary device on the second piconet, the primary eSCO link, and the secondary eSCO link.

As illustrated in the top portion of FIG. 7, a transmit and receive cycle includes two time slots. The first six time slots represent a transmit and receive window (where packets can be transmitted and received) and the next six time slots correspond to an idle window (where no packets are transmitted and received). The time slots of the primary piconet are controlled according to a scheduler of the first device (that is the primary device in the first piconet). The time slots of the first Bluetooth radio (that is a secondary device in the first piconet and is indicated as a "secondary BT" in FIG. 7) may be initially misaligned relative to the time slots of the primary piconet. Likewise, the time slots of the second Bluetooth radio (that is a primary device in the second piconet and is indicated as a "primary BT" in FIG. 7) may be initially misaligned relative to the time slots of the first Bluetooth radio.

Figure 8:
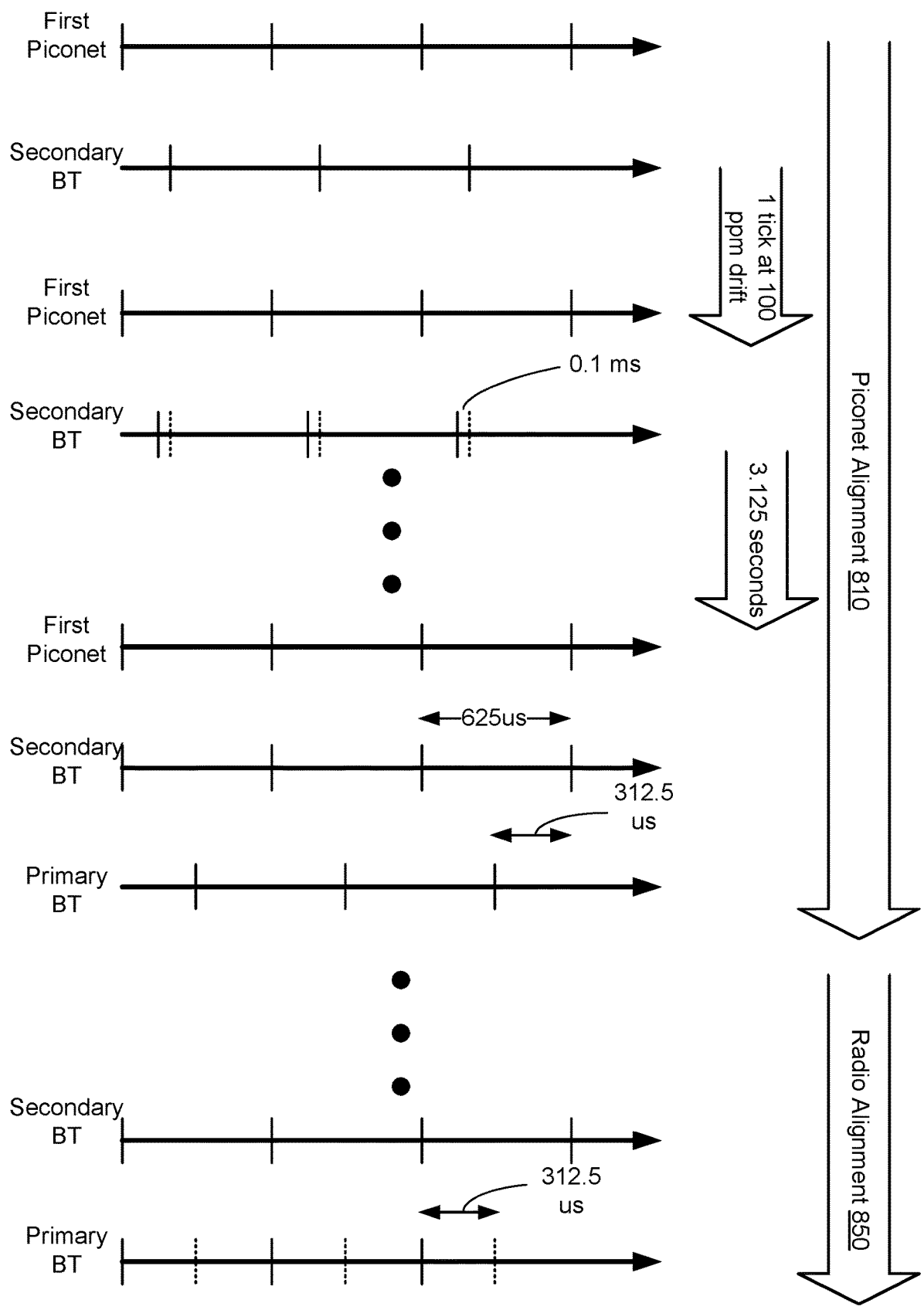
FIG. 8 illustrates an example diagram for aligning time slots based on radio clocks, according to embodiments of the present disclosure.

The aligning 710 is performed such that the time slots are aligned across the first piconet, the first Bluetooth device, and the second Bluetooth device. In an example, the aligning 710 includes tracking the time slots of the first piconet and aligning the time slots of the first Bluetooth radio to the time slots of the first piconet and then aligning the time slots of the second Bluetooth radio to the time slots of the first Bluetooth radio (and, thereby, aligning the time slots of the second piconet to the time slots of the first piconet). FIG. 8 further illustrates an example of the aligning 710.

Once the aligning 710 is performed, the anchoring 720 can follow. The anchoring 720 can set an anchor point for the second Bluetooth radio relative to the time slots of the first Bluetooth radio. Because the first Bluetooth radio is a secondary device in the first piconet, its anchor point may be dictated by the first device and, thus, cannot be changed relative to the time slots of the first piconet. In comparison, such a change is possible for the second Bluetooth device because it is a primary device in the second piconet. The anchor point is set as an odd multiple of an anchor offset or as a maximum anchor offset, where the anchor offset corresponds to a single time slot. The setting can depend on link qualities, including PER.

Once the anchoring 720 is performed, a time synchronization can be achieved similarly to any of FIGS. 5-6 as illustrated in the bottom portion of FIG. 7. Over time, if the time slots of the first piconet change (e.g., due to crystal drift), the aligning 710 can be re-performed. Further, if the link qualities change, the anchoring 720 can be re-performed.

FIG. 8 illustrates an example diagram for aligning time slots based on radio clocks, according to embodiments of the present disclosure. Here, the aligning is an example of the aligning 710 of FIG. 7. The description also refers to the computing device having the first and second Bluetooth radios, the first device managing the first piconet, the second device being a secondary device on the second piconet, the primary eSCO link, and the secondary eSCO link.

As illustrated, the aligning can be performed in multiple stages. In a first stage, the time slots of the first Bluetooth radio (e.g., "secondary BT") are aligned over multiple iterations to the time slots of the first piconet as indicated with the piconet alignment 810. In a second stage, the time slots of the second Bluetooth radio (e.g., "primary BT") are aligned over multiple iterations to the time slots of the first Bluetooth radio, as indicated with the radio alignment 850. Although the two stages are illustrated as being in sequence, the two stages can overlap. For instance, after the time slots of the first Bluetooth radio are adjusted in an iteration of the first stage, the time slots of the second Bluetooth radio are adjusted next in an iteration of the second stage, and a next iteration of the first stage is not performed until the iteration of the second stage is complete and an acknowledgement is received about the completion.

For the sake of clarity, the following assumptions are made. The first Bluetooth device is a secondary device in the first piconet (e.g., "secondary BT"), whereas the second Bluetooth device is a primary device in the second piconet (e.g., "primary BT"). Four clocks exist: a first one for the first piconet, a second one for the first Bluetooth radio, a third one for the second Bluetooth radio, and a fourth one for the second piconet. Because the second Bluetooth device is a primary device, the fourth clock of the second piconet is tied to the third clock of the second Bluetooth device. Because the first Bluetooth radio is a secondary device, the first clock of the first piconet is tied to the first device rather than the first Bluetooth radio. The eSCO anchor point can start on any period of the piconet clock. A primary device sets the eSCO anchor point. The two Bluetooth radios share a same crystal oscillators, such that the second clock of the first Bluetooth radio and the third clock of the second Bluetooth radio track a same frequency of the crystal oscillator.

The first Bluetooth radio slowly adjusts its clock until it lines up with the secondary device slot boundary of the first clock of the first piconet. For instance, given a two-hundred fifty parts per million (250 ppm) allowable crystal drift, if the Bleutooth radios' crystal tolerance is tighter (e.g. 50 ppm), the Bluetooth radios can slowly drag their clocks to synchronize to the secondary device slot boundary. Hence, for a one tick at 100 ppm drift to leave margin to 250 ppm specified by the Bluetooth protocol, each drag iteration can adjust the second clock by 0.1 millisecond and it would take 3.125 seconds to move 312.5 µs (need to drag at most half a time slot, where a time slot is 625 µs).

Similarly, the second Bluetooth radio drags its third clock until it is synced to the second clock of the first Bluetooth radio. The second Bluetooth radio then sets an eSCO anchor point to achieve the desired timing. The first Bluetooth radio continues dragging its second clock to track the first clock of the first piconet given the first device's crystal drift. Whenever the first Bluetooth radio drags its second clock, the first Bluetooth radio informs the second Bluetooth radio (e.g., by sending a message over an interface bus between the two Bluetooth radios). In response, the second Bluetooth radio drags its third clock by the same amount and then acknowledges the adjustment of its third clock to the first Bluetooth radio (e.g., by sending an acknowledgement message over the interface bus). The first Bluetooth radio waits for the acknowledgement before it drags its second clock again as needed.

Figure 9:
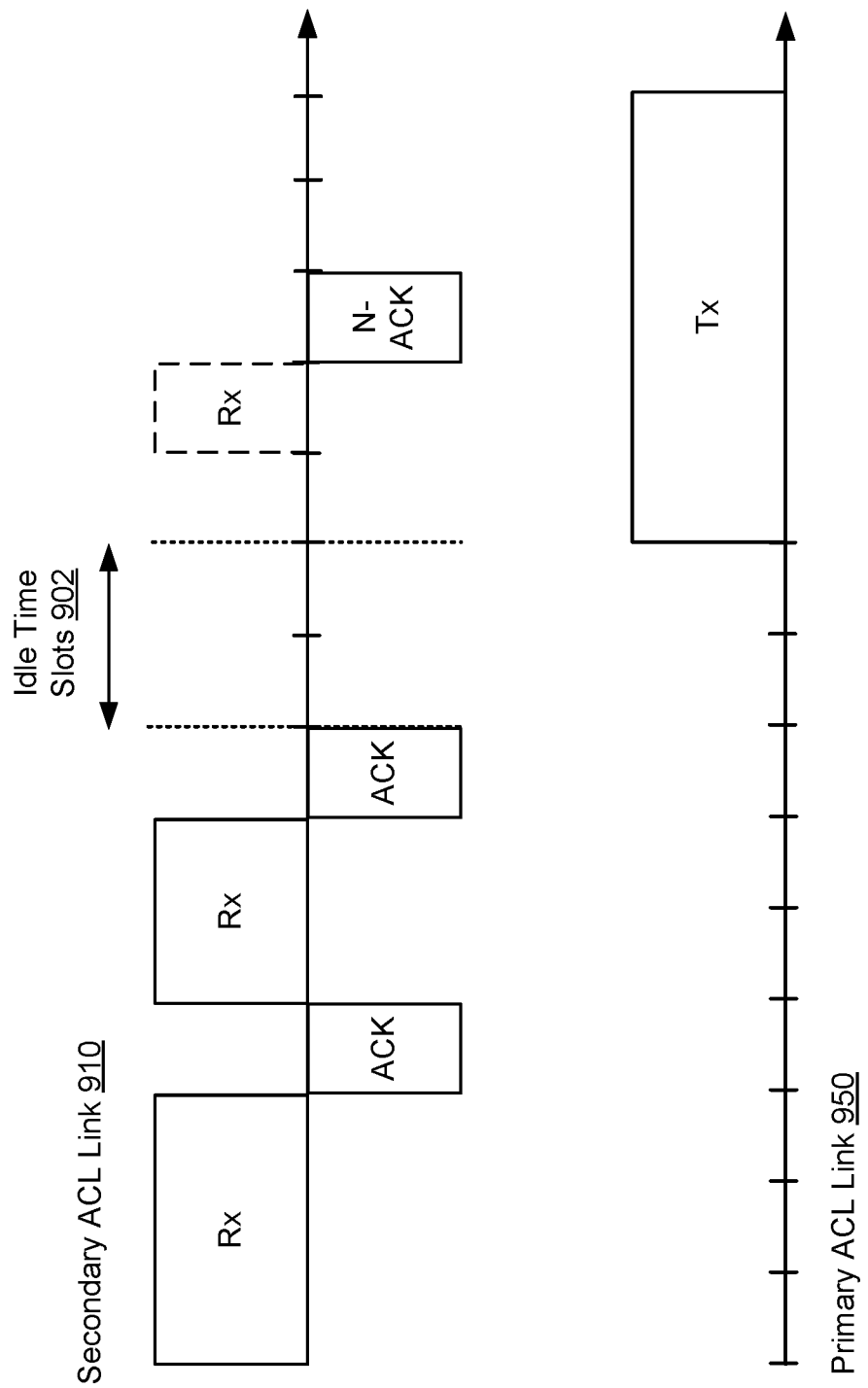
FIG. 9 illustrates an example diagram for asynchronous audio communications, according to embodiments of the present disclosure.

FIG. 9 illustrates an example diagram for asynchronous audio communications, according to embodiments of the present disclosure. The asynchronous audio communications can be used to, for example, stream content such as music. Here also, reference is made to a computing device having a first Bluetooth radio and a second Bluetooth radio, connected to a first device via the first Bluetooth radio and to a second device via the second Bluetooth radio. The connection with the first device uses a first ACL link, where the first device is a primary device that manages a first piconet, and where the first Bluetooth device is a secondary device in the first piconet. In comparison, the connection with the second device uses a second ACL link, where the second Bluetooth radio is a primary device that manages a second piconet, and where the second device is a secondary device in the second piconet. The first ACL link is shown in FIG. 9 as a secondary ACL link 910 to indicate that the first Bluetooth radio is a secondary device. The second ACL link is shown as a primary ACL link 950 to indicate that the second Bluetooth radio is a primary device.

In asynchronous audio communications, the first device can receive multiple audio packets in bursts, where multiple audio packets are sent over multiple consecutive time slots. Accordingly, the computing device (and, in particular, the first Bluetooth radio) receives audio packets in bursts over the secondary ACLS link 910 from the first device. Similarly, the second Bluetooth radio transmits received audio packets over the primary ACL link 950 to the second device in bursts.

To avoid RF interference, the operations of the two Bluetooth radios need to be synchronized. In particular, when the first Bluetooth radio is receiving packets over the secondary ACL link 950, the second Bluetooth radio does not transmit audio packets over the primary ACL link 910. In this way, a reception on one Bluetooth radio does not overlap with a transmission from the other Bluetooth radio, thereby avoiding RF interference between the two Bluetooth radios.

To further avoid any overlap, the clocks of the two Bluetooth radios can also be aligned in a similar manner as the alignment described in connection with FIGS. 8-9. In particular, the time slot boundaries are aligned across the two ACL links 910 and 950 (e.g., each time slot on the secondary ACL link 910 is synchronous with a corresponding time slot on the primary ACL link 950). The alignment includes aligning the clock of the first Bluetooth radio to the clock of the first piconet (since the first Bluetooth radio is a secondary device in the first pcionet) and aligning the clock of the second Bluetooth radio to the clock of the first Bluetooth radio (since the second Bluetooth radio is a primary device in the second piconet).

Accordingly, for asynchronous audio communications, the computing device needs to switch between receiving audio packets at the first Bluetooth radio to transmitting audio packets from the second Bluetooth radio, where the switching needs to be coordinated (e.g., to avoid overlap). FIG. 9 illustrates one example technique to trigger a coordinated switch, relying in idle time slots. FIG. 10 illustrates another example technique that relies on a number of buffered audio packets. Both techniques may be used in conjunction.

As illustrated in FIG. 9, the first Bluetooth device receives audio packets from the first device over the secondary ACL link 910 and transmits acknowledgments (ACKs) about the reception back to the first device over the secondary ACL link 910. In the particular illustration of FIG. 9, the first device receives a first audio packet that is three time slots long and transmits a first acknowledgment, and then receives a second audio packet that is two time slots long and transmits a second acknowledgment. The received audio packets are stored in a shared memory of the computing device. Thereafter, the first Bluetooth radio does not receive audio packets from the first device over the secondary ACL link 910 for a number of time slots. These time slots are indicated as idle time slots 902 in FIG. 9. If the number of idle time slots 902 is greater than a predefined threshold (e.g., a predefined number of idle time slots), the computing device switches from receiving to transmitting. In other words, the number of idle time slots 902 exceeding the predefined threshold is the trigger for the coordinated switch.

In an example, the predefined threshold can be dynamically adjusted based on link conditions, such as the PER associated with the secondary ACL link 910. In particular, when the PER deteriorates, it is expected the first device will use shorter and more frequent audio packet bursts. Accordingly, the predefined threshold is shortened. In other words, the larger the PER is, the smaller the predefined threshold becomes.

At the end of the idle time slots 902, the second Bluetooth radio starts transmitting the audio packets that are stored in the shared memory. As illustrated, the second Bluetooth radio sends an audio packet that is five time slots long, where this audio packet corresponds to an aggregation of the first audio packet and the second audio packet. Of course, no aggregation may be performed and the second Bluetooth radio may send the first audio packet and the second audio packet separately from each other.

During the transmission by the second Bluetooth radio over the primary ACL link 950, the first device can also transmit one or more packets over the secondary ACL link 910. However, the first Bluetooth radio may send a negative acknowledgement (NACK) to the first device over the secondary ACL link 910, thereby indicating that the one or more audio packets were not received (as illustrated with a dashed box in FIG. 9) and causing to first device to subsequently re-transmit the one or more packets. The computing device can use negative acknowledgments as a flow control mechanism, where the rate of receiving audio packets by the first Bluetooth radio from the first device can be throttled to match or approach the rate of transmitting audio packets by the second Bluetooth radio to the second device.

The computing device can also switch from transmitting to receiving upon a trigger for a coordinated switch. In this switch, the second Bluetooth device stops transmitting audio packets over the primary ACL link 950 and the first Bluetooth radio may start receiving audio packets over the secondary ACL link 950. Different triggers are possible. In one example, the trigger is whether the shared memory is empty or not. In particular, when all stored audio packets have been transmitted (and their receipt acknowledged by the second device), the shared memory is flushed, and the computing device performs the switch to receiving. In another example, the trigger is the total number of transmitted audio packets. For instance, the total number is compared to a predefined number (e.g., three). Once the predefined number is reached, the switch is performed. In this example, the shared memory may not be flushed. In yet another example, the trigger is the total number of remaining audio packets that are stored in the shared memory and have not been transmitted. For instance, the total number is to a predefined number (e.g., one). Once the predefined number is reached, the switch is performed. In this example, the shared memory may not be flushed.

In an example, switching between receiving and transmitting includes the first Bluetooth radio sending a message to the second Bluetooth radio indicating that audio packets are stored in the shared memory and pausing the reception of additional audio packets over the secondary ACL link 910. Conversely, switching between transmitting and transmitting includes the second Bluetooth radio sending a message to the first Bluetooth radio indicating that its transmission is complete and pausing the transmission of additional audio packets (if any remain stored in the shared memory) over the primary ACL link 950.

In an example, the computing device (e.g., the first Bluetooth radio or a processor of the computing device) computes the airtime of the first device. If the airtime exceeds a predefined threshold (e.g., a predefined percentage, such as fifty percent), the computing device may not send the audio packets received from the first device over the primary ACL link 950 to the second device. Instead, an audio output can be presented by a speaker of the computing device.

In particular, each transmit and receive cycle can occupy twelve time slots. The airtime of the first device is computed as the total number of time slots transmitted by the first device in a transmit and receive cycle. If in any of such cycles, or if on average within a predefined number of last time cycles, the total number exceeds a predefined threshold (e.g., more than six time slots or fifty percent), the computing device switches off the transmission over the primary ACL link 950.

Figure 10:
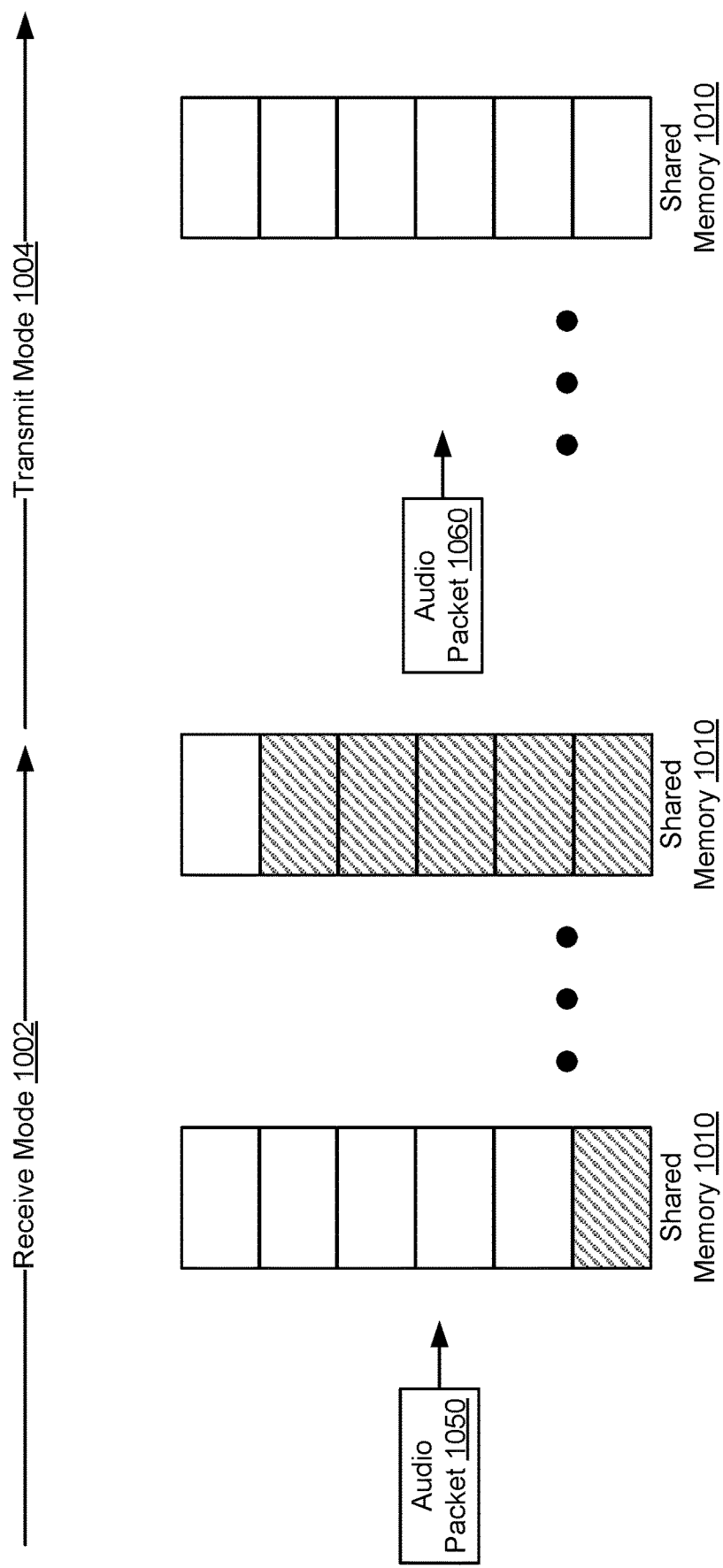
FIG. 10 illustrates another example diagram for asynchronous audio communications, according to embodiments of the present disclosure.

FIG. 10 illustrates another example diagram for asynchronous audio communications, according to embodiments of the present disclosure. In particular, another example technique to trigger a coordinated switch from receiving to transmitting is described, where the trigger depends on the number of buffered audio packets. Here also, reference is made to the computing device having the first Bluetooth radio and the second Bluetooth radio, connected to the first device over a secondary ACL link, and connected to the second device over the primary ACL link.

As illustrated, the switch from a receive mode 1002 to a transmit mode 1004 is performed in a coordinated manner such that the two modes 1002 and 1004 do not overlap. The receive mode 1002 refers to the first Bluetooth radio receiving one or more audio packets from the first device over the secondary ACL link. In the receive mode 1002, the second Bluetooth radio does not transmit audio packets over the primary ACL link. The transmit mode 1004 refers to the second Bluetooth radio transmitting one or more audio packets over the primary ACL link to the second device over the primary ACL link. In the transmit mode 1004, the first Bluetooth radio does not receive audio packets over the secondary ACL link and sends a negative acknowledgment to any transmission of an audio packet by the first device over the secondary ACL link.

During the receive mode 1002, the first Bluetooth radio receives an audio packet 1050 from the first device. The audio packets 1050 is stored in a shared memory 1010 of the computing device (as shown with the diagonal shading). Although not shown in FIG. 10, the first Bluetooth radio sends an acknowledgement to the first device. Over time and while still in the receive mode 1002, one or more additional audio packets are received by the first Bluetooth radio from the first device and stored in the shared memory 1010 (as shown with the diagonal shading). These audio packets remain stored (e.g., are buffered) in the shared memory 1010 until a switch to the transmit mode 1004.

In an example, the trigger for the switch from the receive mode 1002 to the transmit mode 1004 depends on the number of stored (e.g., buffered) audio packets. If that number exceeds a predefined threshold (e.g., four audio packets), the switch occurs. In another example, the trigger depends on the amount of used memory for the storage (e.g., for the buffering). If that amount exceeds a predefined threshold (e.g., seventy-five percent of the size of the shared memory 1010), the switch occurs.

In the transmit mode 1004, the second Bluetooth radio accesses the shared memory 101 and starts transmission of one or more stored audio packets in the shared memory 1010, including an audio packet 1060. Given the link qualities, the second Bluetooth radio may aggregate some or all of the stored audio packets to transmit longer packets. For instance, if the PER associated with the second link is low (e.g., smaller than a predefined PER), the aggregation may be performed.

The transmission continues until a trigger to switch from the transmit mode 1004 to the receive mode 1002 is determined. Here, the trigger can depend on the number of transmitted audio packets. If that number exceeds a predefined threshold (e.g., four audio packets), the switch occurs. Or if all stored audio packets have been transmitted, the switch occurs. The trigger can also depend on the remaining number of audio packets that are stored in the shared memory 1010 but have not been transmitted yet. If that number is smaller than a predefined threshold (e.g., one audio packet), the switch occurs. In another example, the trigger depends on the amount of freed up memory. As an audio packet is transmitted (and an acknowledgement is received from the second device), the memory space occupied by that audio packet is freed up. Accordingly, if all the previously used memory space is freed up or the freed up amount of memory space is less than a threshold of the total size of the shared memory 1010 (e.g., less than ten percent), the switch occurs.

Switching can include message passing from the first Bluetooth radio to the second Bluetooth radio as described in connection with FIG. 9. Alternatively, no messaging may be used. In particular, both Bluetooth radios may track the number of stored audio packets and/or the amount of used memory space and compare the number and/or amount to the relevant threshold. As such, each of the Bluetooth radios detect the trigger and performs the switch. In the case of a switch from the receive mode 1002 to the transmit mode 1004, the first Bluetooth radio pauses reception and starts transmitting negative acknowledgements to the first device as applicable. The second Bluetooth radio starts transmission of stored audio packets. In the case of a switch from the transmit mode 1004 to the receive mode 1002, the second Bluetooth radio pauses transmission and the first Bluetooth radio resumes reception.

Figure 11:
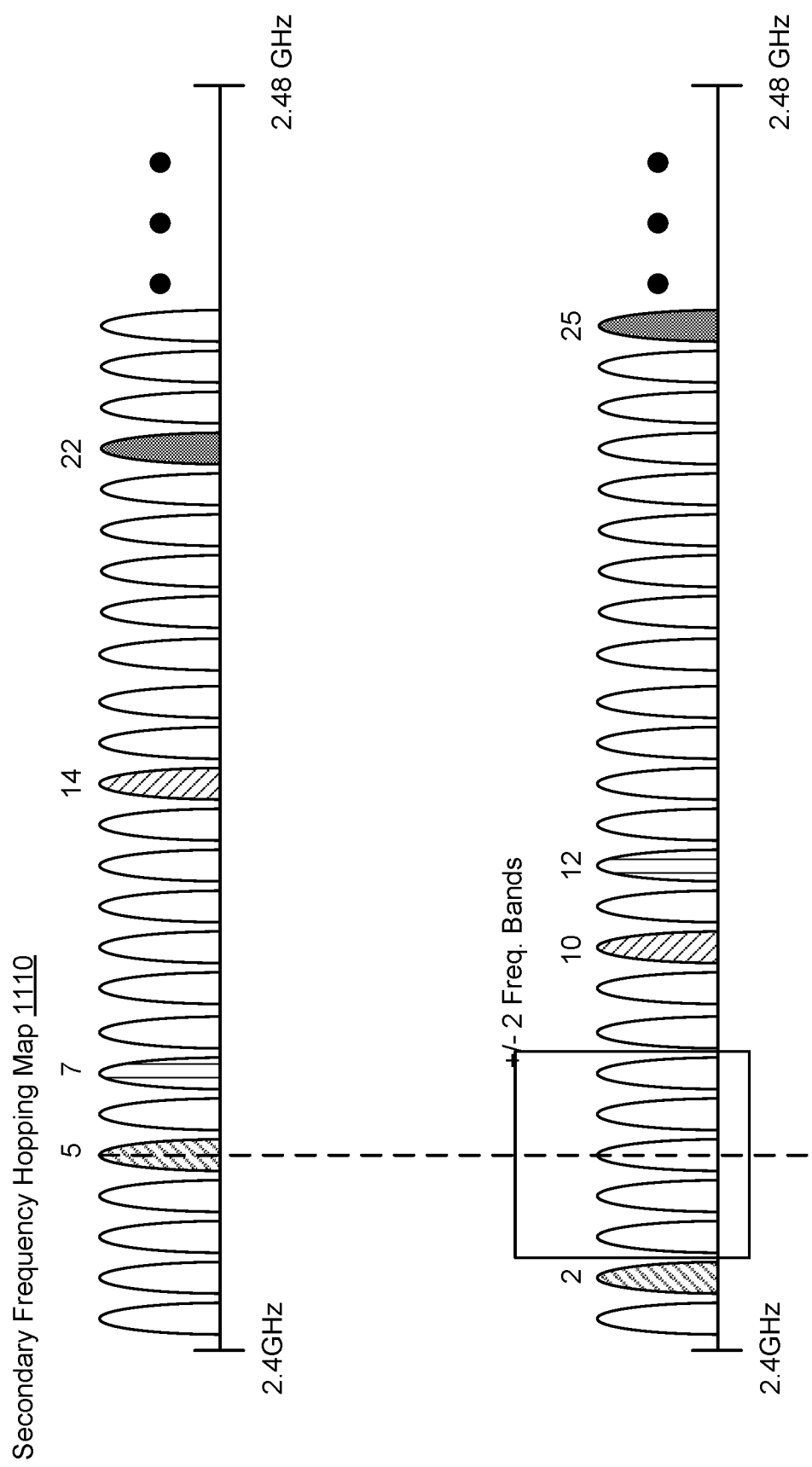
FIG. 11 illustrates example frequency hopping maps, according to embodiments of the present disclosure.

FIG. 11 illustrates example frequency hopping maps, according to embodiments of the present disclosure. Generally, the Bluetooth band spans between 2.4 GHz and 2.48 GHz. This band can be divided into sub-bands or frequency channels, referred to herein as frequency bands. A frequency hopping map defined for a Bluetooth radio indicates particular frequency bands for transmission and/or reception by the Bluetooth radio, where the Bluetooth radio hops (e.g., changes) from one frequency band to another frequency band as defined by the frequency hopping map. When a computing device includes two Bluetooth radios, a frequency hopping map can be defined for each of the Bluetooth radios in a manner to further reduce or eliminate RF interference between the two Bluetooth radios. Here also, reference is made to the computing device having the first Bluetooth radio and the second Bluetooth radio, connected to the first device over a secondary link, and connected to the second device over the primary link.

Because the first device is the primary device in the first piconet, the first device defines the frequency hopping map to use. The first Bluetooth radio receives the frequency hopping map and follows it such that the frequency bands used for the reception of audio packets correspond to the frequency bands used for the transmission of such audio packets from the first device. This frequency hopping map is illustrated in FIG. 11 as a "secondary" frequency hopping map 1110 to indicate that the first Bluetooth device is a secondary device in the first piconet.

As illustrated, the secondary frequency hopping map 1110 identifies a sequence of four frequency bands. Per the illustrated secondary frequency hopping map 1110, the first Bluetooth device is to receive a first audio packet by using frequency band number five and then a second audio packet by using frequency band number fourteen. The first Bluetooth device is also to transmit a third audio packet by using frequency band number seven and then a fourth audio packet by using frequency band number twenty-two.

Because the second Bluetooth radio is a primary device in the second piconet, the second Bluetooth radio can manage the frequency hopping map in the second piconet. In other words, the second Bluetooth radio (or a processor of the computing device) generates the frequency hopping map to be used by the second Bluetooth device. This frequency hopping map is illustrated in FIG. 11 as a "primary" frequency hopping map 1150 to indicate that the second Bluetooth device is a primary device in the second piconet. The second Bluetooth device can sent the primary frequency hopping map 1150 to the second device (that is a secondary device in the second piconet).

To further reduce or eliminate RF interference, the primary frequency hopping map 1150 can be generated based on the secondary frequency hopping map 1110. In particular, and as described in connection with the previous figures, the reception of an audio packet by the second Bluetooth radio can be time synchronized with the reception of an audio packet by the first Bluetooth device (e.g., the two time slots are synchronous). Accordingly, the second Bluetooth radio should receive its audio packet by using a different frequency band than the frequency band used by the first Bluetooth radio for its audio packet reception. Likewise, the transmission of an audio packet by the second Bluetooth radio can be time synchronized with the transmission of an audio packet by the first Bluetooth device (e.g., the two time slots are synchronous). Accordingly also, the second Bluetooth radio should transmit its audio packet by using a different frequency band than the frequency band used by the first Bluetooth radio for its audio packet transmission. In other words, in addition to synchronizing the time slots, the use of frequency bands is coordinated. The primary frequency hopping map 1150 is generated to provide such frequency band coordination.

In an example, the primary frequency hopping map 1150 is generated according to a rule that identifies a predefined frequency band offset, such as a predefined number of stay away frequency bands. In the illustration of FIG. 11, that predefined number is set to plus or minus two. In particular, the first Bluetooth radio is to receive the first audio packet by using frequency band number five per the secondary frequency hopping map 1110. Accordingly, the primary frequency hopping map 1150 defines that, for the synchronous reception of a first audio packet by the second Bluetooth radio, the second Bluetooth radio should use a frequency band that is at least at the predefined number (e.g., two) of frequency bands away from the frequency band number five. Hence, the usable frequency band for the second Bluetooth radio can be any of frequency bands number one, two, eight or greater but not any of frequency bands three, four, five, six, and seven. In the illustration of FIG. 11, this frequency band is set in the primary frequency hopping map 1150 to the frequency band number two. This process is repeated to define the remaining usable bands. For instance, whereas the first Bluetooth radio is to receive the second audio packet at frequency band number fourteen, the second Bluetooth radio is to synchronously receive a second audio packet at frequency band number ten. Whereas the first Bluetooth radio is to transmit the third audio packet at frequency band number seven, the second Bluetooth radio is to synchronously transmit a third audio packet at frequency band number twelve. And whereas the first Bluetooth radio is to transmit the fourth audio packet at frequency band number twenty-two, the second Bluetooth radio is to synchronously transmit a fourth audio packet at frequency band number twenty-five.

FIGS. 12-16 illustrate example flows for using a computing device that includes a plurality of radios, according to embodiments of the present disclosure. The computing device can be any of the computing devices described in connection with FIGS. 1-11. In particular, the computing device includes at least a first Bluetooth radio, a second Bluetooth radio, and a third wireless radio. Some of the operations can be implemented via specific hardware on the computing device, while other operations can be implemented as computer-readable instructions stored on a non-transitory computer-readable medium of the computing device. As stored, the computer-readable instructions represent programmable modules that include code executable by a processor of the computing device. The execution of such instructions configures the computing device to perform the respective operations. Each programmable module in combination with the processor represents a means for performing a respective operation(s). While the operations are illustrated in a particular order, it should be understood that no particular order is necessary and that one or more operations may be omitted, skipped, and/or reordered.

Figure 12:
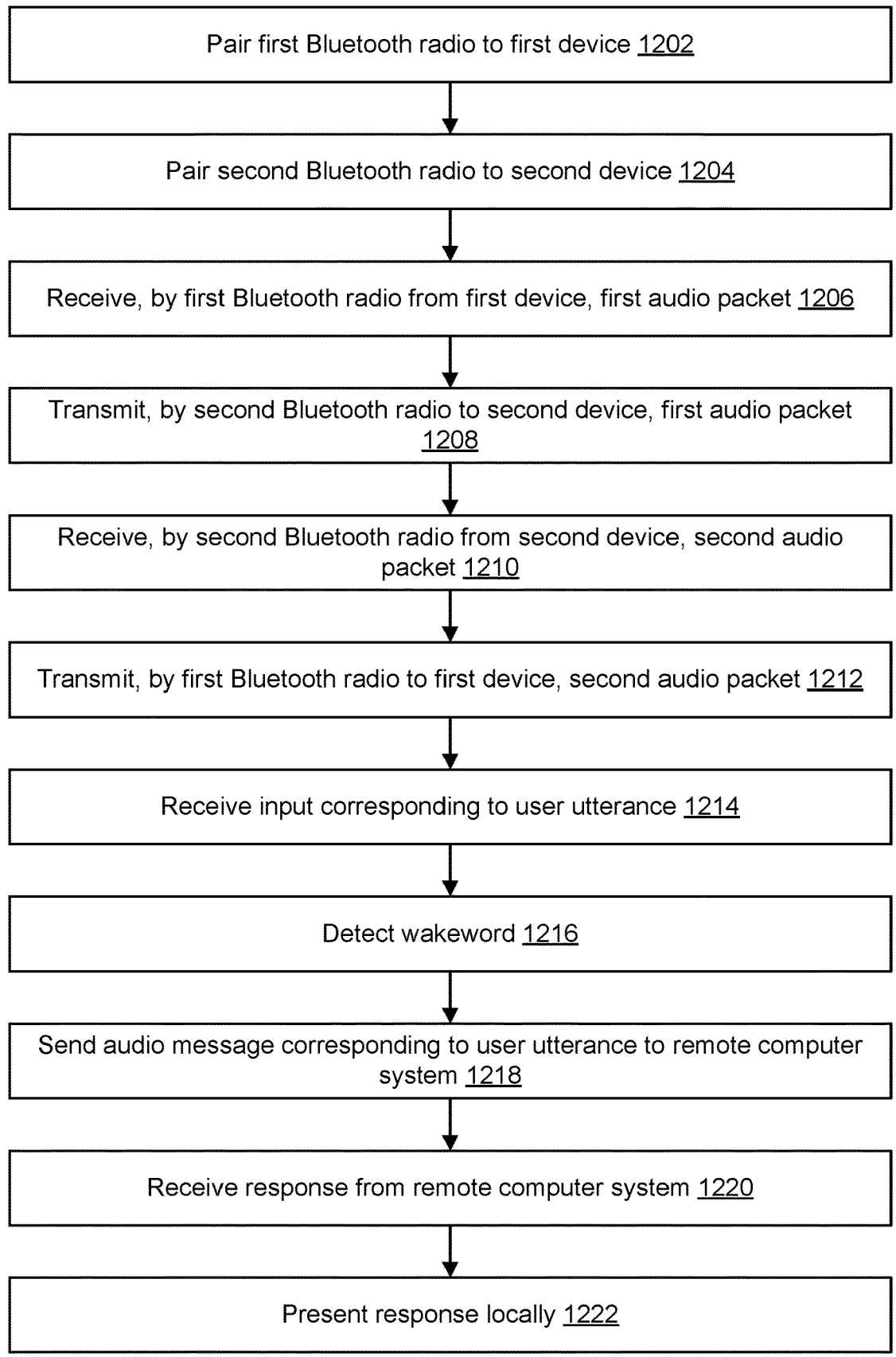
FIG. 12 illustrates an example flow for audio communications by a computing device that includes a plurality of radios, according to embodiments of the present disclosure.

FIG. 12 illustrates an example flow for audio communications by the computing device that includes a plurality of radios, according to embodiments of the present disclosure. The example flow may start at operation 1202, where the computing device pairs the first Bluetooth radio to a first device. The pairing is in compliance with a Bluetooth protocol. The first device may be a primary device in a first piconet. Accordingly, the first Bluetooth radio is a secondary device in the first piconet and may be referred to as a secondary Bluetooth radio. In addition, one or more Bluetooth links can be established through the pairing between the first Bluetooth radio and the first device. The one or more Bluetooth links include, for instance, an eSCO link and/or an ACL link. If so, these links can be referred to as a secondary eSCO link and a secondary ACL link.

At operation 1204, the computing device pairs the second Bluetooth radio to a second device. The pairing is in compliance with a Bluetooth protocol. The second Bluetooth radio may be a primary device in a second piconet, whereas the second device may be a secondary device in the second piconet. Accordingly, the second Bluetooth may be referred to as a primary Bluetooth radio. In addition, one or more Bluetooth links can be established through the pairing between the second Bluetooth radio and the second device. The one or more Bluetooth links include, for instance, an eSCO link and/or an ACL link. If so, these links can be referred to as a primary eSCO link and a primary ACL link.

At operation 1206, the computing device receives a first audio packet from the first device. For example, the first audio packet is received by the first Bluetooth radio over an established Bluetooth link. The Bluetooth link can depend on the source of the first audio packet and/or the type of audio communications. For instance, if the first device is executing a communications application (e.g., one for phone calls) and the first audio packet is associated with synchronous communications, the first audio packet can be received over the secondary eSCO link. If the first device is executing a content application (e.g., one for streaming music) and the first audio packet is associated with asynchronous communications, the first audio packet can be received over the secondary ACL link. The first Bluetooth radio stores the first audio packet in a memory of the computing device.

At operation 1208, the computing device transmits the first audio packet to the second device. For example, the second Bluetooth radio accesses the first audio packet from the memory and transmits the first audio packet over an established Bluetooth link. The Bluetooth link can depend also on the source of the audio packet. For synchronous communications, the first audio packet can be transmitted over the primary eSCO link. For asynchronous communications, the first audio packet can be transmitted over the primary ACL link. The transmission may avoid changing the codec of the first audio packet. Depending on link qualities and for asynchronous communications, transmitting the first audio packet can include aggregating the first audio packet with one or more audio packets stored in the memory and transmitting the resulting, longer audio packet. Further, for asynchronous communications, transmitting the first audio packet includes switching off the first Bluetooth radio and switching on the second Bluetooth radio, thereby changing from a reception mode to a transmission mode.

At operation 1210, the computing device receives a second audio packet from the second device. For example, the second audio packet is received by the second Bluetooth radio over an established Bluetooth link. The Bluetooth link can depend on the source of the second audio packet and/or the type of audio communications. For instance, if the second audio packet is associated with synchronous communications, the second audio packet can be received over the primary eSCO link. If the second audio packet is associated with asynchronous communications, the second audio packet can be received over the primary ACL link. The second Bluetooth radio stores the second audio packet in the memory. Further, for synchronous communications, the reception of the second audio packet can be synchronous with the reception of the first audio packet. In addition, the second Bluetooth radio can receive the second audio packet by using a second frequency band that is at a predefined number of frequency bands away from a first frequency band used by the first Bluetooth radio for the reception of the first audio packet.

At operation 1212, the computing device transmits the second audio packet to the first device. For example, the first Bluetooth radio accesses the second audio packet from the memory and transmits the second audio packet over an established Bluetooth link. The Bluetooth link can depend also on the source of the second audio packet and/or the type of the audio communications. For synchronous communications, the second audio packet can be transmitted over the secondary eSCO link. For asynchronous communications, the first audio packet can be transmitted over the secondary ACL link. The transmission may avoid changing the codec of the second audio packet. Depending on link qualities and for asynchronous communications, transmitting the second audio packet can include aggregating the second audio packet with one or more audio packets stored in the memory and transmitting the resulting, longer audio packet. Further, for synchronous communications, the transmission of the second audio packet can be synchronous with the transmission of the first audio packet. In addition, the second Bluetooth radio can transmit the first audio packet by using a third frequency band that is at the predefined number of frequency bands away from a fourth frequency band used by the first Bluetooth radio for the transmission of the second audio packet. The above operations can be repeated for the processing of multiple audio packets.

At operation 1214, the computing device receives an input corresponding to a user utterance. For instance, a microphone of the computing device can detect the user utterance and generate audio data.

At operation 1216, the computing device detects a wakeword from the input. For example, the computing device performs ASR processing on the audio data to detect words and detect a match between one of the words with a pre-stored wakeword.

At operation 1218, the computing device sends an audio message corresponding to the user utterance to a remote computer system. For example, the computing device has an established data connection with the remote computer system, where the data connection is via the third wireless radio of the computing device. The third wireless radio transmits the audio input to the remote computer system. In response, the remote computer system performs ASR and NLU processing on the audio input to generate intent data, initiate a computing service based on the intent data, and transmit a response back to the computing device over the data connection.

At operation 1220, the computing device receives the response from the remote computer system. For example, the third wireless radio receives the response. The response can include commands (e.g., one or more directives to establish a data connection via the third wireless radio with a content source for content streaming or with an end user device for voice communications) and/or data (e.g., content for a TTS message).

At operation 1222, the computing device presents the response locally. For example, the computing device generates and plays the TTS message over a speaker of the computing device. In addition, and as applicable, the computing device establishes the data connection via the third wireless radio with a target system (e.g., the content source or the end user device) and data packets received in this data connection from the target system via the third wireless radio can be presented locally on the computing device.

Figure 13:
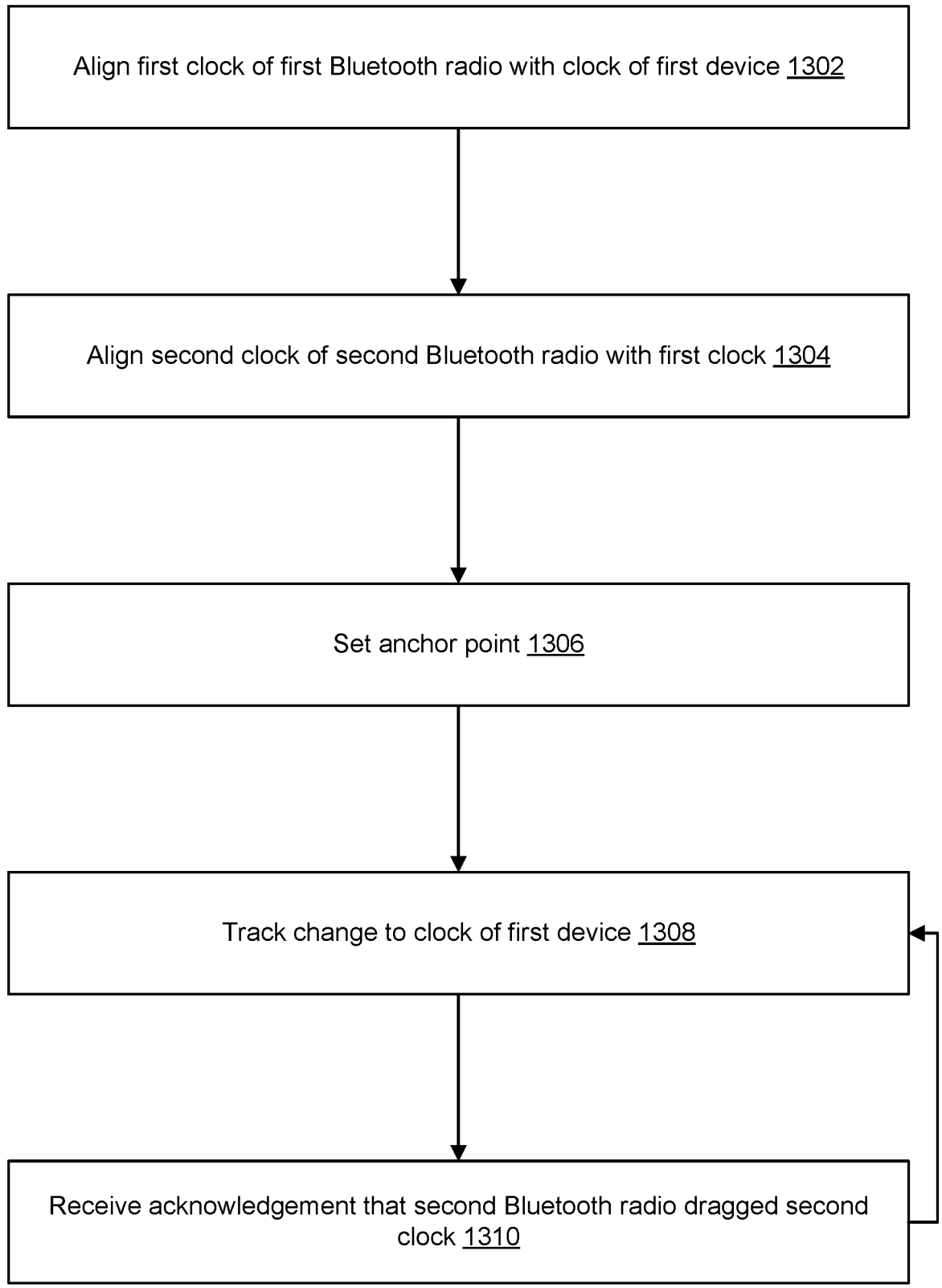
FIG. 13 illustrates an example flow for aligning and anchoring time slots to support audio communications, according to embodiments of the present disclosure.

FIG. 13 illustrates an example flow for aligning and anchoring time slots to support audio communications, according to embodiments of the present disclosure. In an example, the flow is performed such that the clock of the second Bluetooth radio (acting as a primary device) is aligned with the clock of the first Bluetooth radio (acting as a secondary device). In this way, for synchronous communications, the two Bluetooth radios can receive packets synchronously and transmit packets synchronously. In this way also, for asynchronous communications, the computing device can switch between a receive mode and a transmit mode in a coordinated manner.

In an example, the example flow starts at operation 1302, where the first Bluetooth radio aligns its first clock with the clocks of the first device. The alignment takes advantage of Bluetooth acceptable margin (e.g., 250 ppm) for crystal drifts. The first Bluetooth radio iteratively drags the first clock within the acceptable margin (e.g., at 100 ppm). After a number of iterations, the first clock becomes aligned with the clock of the first device.

At operation 1304, the second Bluetooth radio aligns its second clock with the first clock of the first Bluetooth radio. In an example, the second Bluetooth radio also iteratively drags its second clock within the acceptable margin (e.g., at 100 ppm) until the second clock is aligned with the first clock. This iterative dragging can be performed after the first clock has been aligned with the first device's clock. Alternatively, each time the first Bluetooth radio performs a dragging iteration, the second Bluetooth radio follows it by also performing a dragging iteration. Data indicating the dragging and/or alignment can be passed between the two Bluetooth radio over an interface bus.

At operation 1306, the second Bluetooth radio sets an anchor point. In an example, the anchor point is set such that to align the boundary of a time slot (e.g., a start of the time slot) of the second Bluetooth radio with the boundary of a time slot (e.g., also the start) of the first Bluetooth radio. In the case of synchronous communications, the anchor point is set as an offset equal to an odd multiplier of the time slot or to a maximum offset given a transmit and receive cycle.

At operation 1308, the first Bluetooth radio tracks a change to the clock of the first device. In an example, the first device's clock drags given the first device's crystal drift. The first Bluetooth radio continues to drag its first clock to track the drag of the first device. In addition, the first Bluetooth radio passes data, for example over the interface bus, to the second Bluetooth radio indicating the dragging of the first clock including, for instance, the amount of the dragging.

At operation 1310, the first Bluetooth radio receives, from the second Bluetooth radio, an acknowledgement that the second Bluetooth radio dragged its second clock. In an example, the second Bluetooth radio drags its second clock by the same amount as the dragging performed by the first Bluetooth radio under operation 1308. In this way, the second Bluetooth radio tracks the first clock of the first Bluetooth radio. When the acknowledgment is received, the first Bluetooth radio can perform additional tracking and dragging given additional drift of the first device, as illustrated with the loop back to operation 1308.

Figure 14:
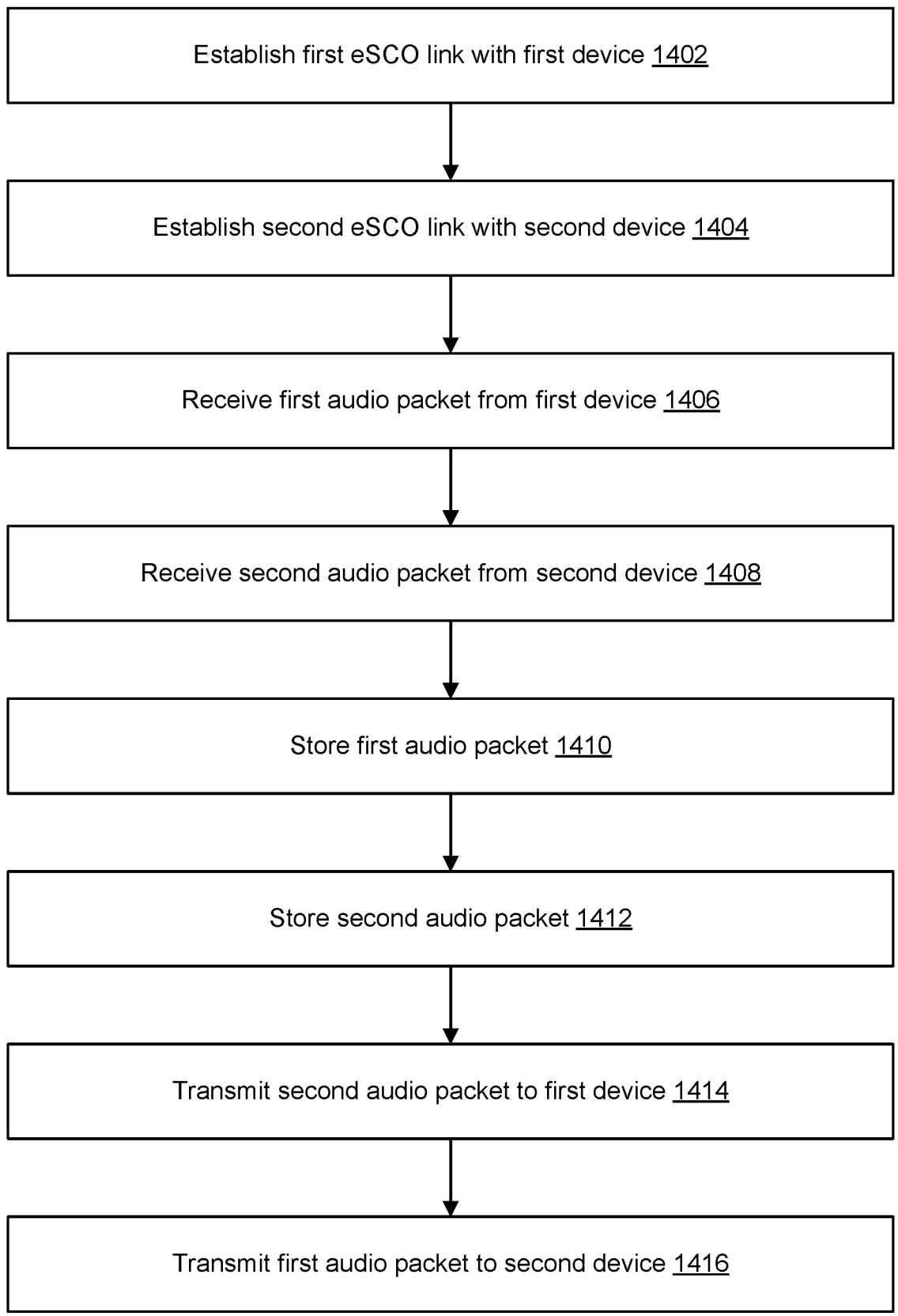
FIG. 14 illustrates an example flow for synchronous audio communications, according to embodiments of the present disclosure.

FIG. 14 illustrates an example flow for synchronous audio communications, according to embodiments of the present disclosure. The example flow may start at operation 1402, where the first Bluetooth radio establishes the first eSCO link with the first device (e.g., the secondary eSCO link). This secondary eSCO link is established in compliance with the Bluetooth protocol.

At operation 1404, the second Bluetooth radio establishes the second eSCO link with the second device (e.g., the primary eSCO link). This primary eSCO link is established in compliance with the Bluetooth protocol.

At operation 1406, the first Bluetooth radio receives a first audio packet from the first device. In an example, the first audio packet is received over the first eSCO link. Further, the first Bluetooth radio uses a first frequency band for the reception based on a first frequency hopping map set for the first Bluetooth radio.

At operation 1408, the second Bluetooth radio receives a second audio packet from the second device. In an example, the second audio packet is received over the second eSCO link. Further, the second Bluetooth radio uses a second frequency band for the reception based on a second frequency hopping map set for the second Bluetooth radio. The second frequency hopping map is set based on the first frequency hopping map such that the second frequency band is at a predetermined number of frequency bands away from the first frequency band. In addition, the reception of the second audio packet can be synchronous with the reception of the first audio packet.

At operation 1410, the first Bluetooth radio stores the first audio packet in the memory of the computing device. For example, the first audio packet is stored in a first memory address without any modification to a codec of the first audio packet.

At operation 1412, the second Bluetooth radio stores the second audio packet in the memory of the computing device. For example, the second audio packet is stored in a second memory address without any modification to a codec of the second audio packet.

At operation 1414, the first Bluetooth radio transmits the second audio packet to the first device. In an example, the second Bluetooth radio sends data to the first Bluetooth radio, over an interface bus for example, indicating that the second audio packet was stored. In another example, the first Bluetooth radio monitors the second memory address and determines that the second audio packet was stored based on the monitoring and without the indication from the second Bluetooth radio. In both examples, the first Bluetooth radio accesses the second audio packet from the second memory address and transmits the second audio packet over the first eSCO link without modifying the codec of the second audio packet. Further, the first Bluetooth radio uses a third frequency band for the transmission based on the first frequency hopping map.

At operation 1416, the second Bluetooth radio transmits the first audio packet to the second device. In an example, the first Bluetooth radio sends data to the second Bluetooth radio, over the interface bus for example, indicating that the first audio packet was stored. In another example, the second Bluetooth radio monitors the first memory address and determines that the first audio packet was stored based on the monitoring and without the indication from the first Bluetooth radio. In both examples, the second Bluetooth radio accesses the first audio packet from the first memory address and transmits the first audio packet over the second eSCO link without modifying the codec of the first audio packet. Further, the second Bluetooth radio uses a fourth frequency band for the reception based on the second frequency hopping map. The second frequency hopping map is set based on the first frequency hopping map such that the fourth frequency band is at a predetermined number of frequency bands away from the third frequency band. In addition, the transmission of the first audio packet can be synchronous with the transmission of the second audio packet.

Figure 15:
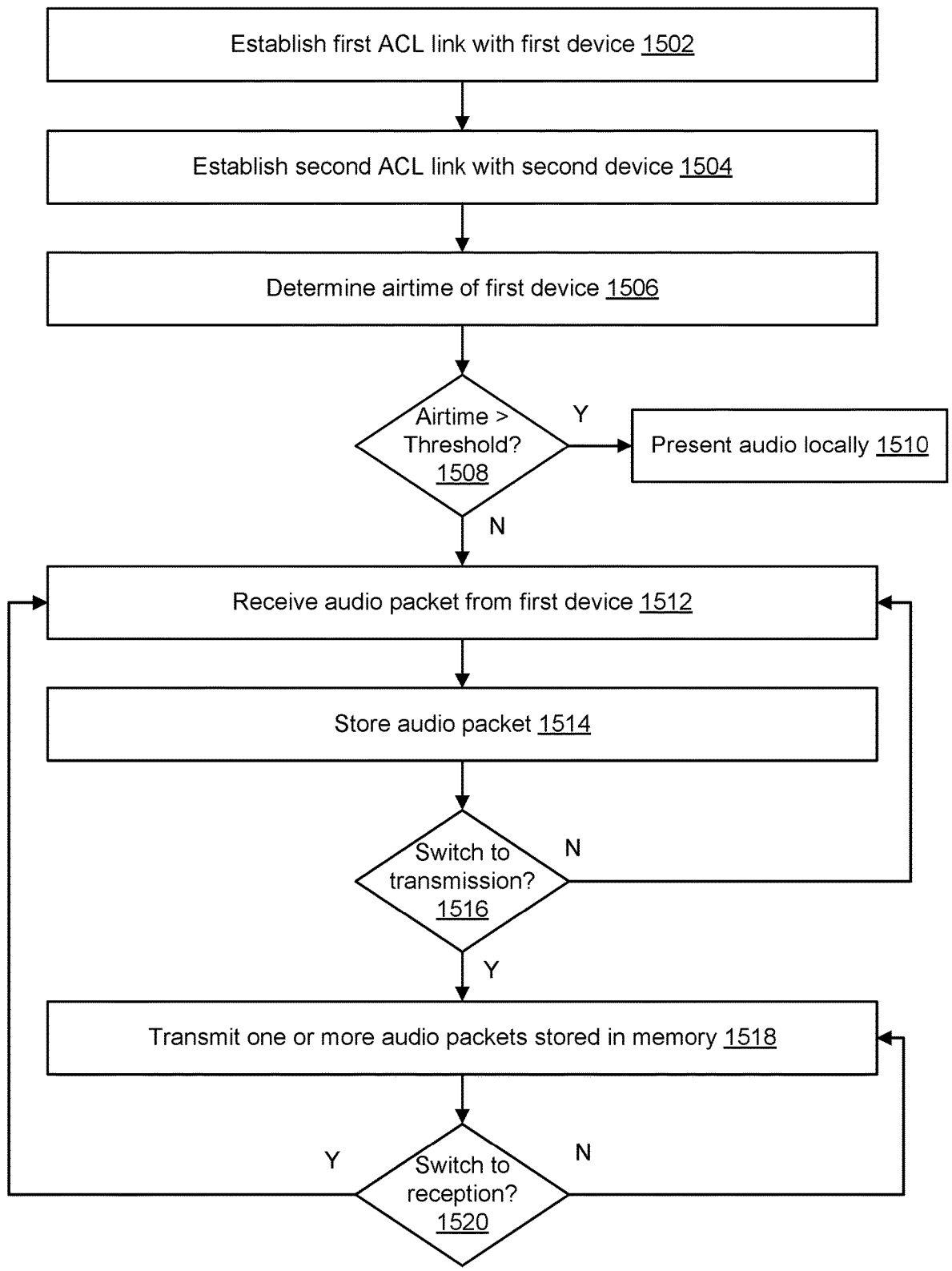
FIG. 15 illustrates an example flow for asynchronous audio communications, according to embodiments of the present disclosure.

FIG. 15 illustrates an example flow for asynchronous audio communications, according to embodiments of the present disclosure. The example flow may start at operation 1502, where the first Bluetooth radio establishes the first ACL link with the first device (e.g., the secondary ACL link). This secondary ACL link is established in compliance with the Bluetooth protocol.

At operation 1504, the second Bluetooth radio establishes the second ACL link with the second device (e.g., the primary ACL link). This primary ACL link is established in compliance with the Bluetooth protocol.

At operation 1506, the computing device determines an airtime of the first device. For example, the computing device monitors the number of time slots used within each transmit and receive cycle over a predefined time duration (e.g., the last transmit and receive cycle, the last ten transmit and receive cycle, etc.). The airtime is computed as the number of used time slots divided by the total number of available time slots within a transmit and receive cycle.

At operation 1508, the computing device determines whether the airtime exceeds a predefined threshold. For example, the computing device determines whether the number of used time slots exceeds fifty percent of the available time slots. If in excess, operation 1510 follows operation 1508. Otherwise, operation 1512 follows operation 1508.

At operation 1510, the computing device presents audio locally. For example, the first Bluetooth radio may receive one or more audio packets from the first device over the first ACL link. Rather than transmitting such audio packets to the second device for presentation thereon, the computing device plays the one or more audio packets over a speaker of the computing device.

At operation 1512, the computing device receives an audio packet from the first device. For example, the first audio packet is received over the first ACL link and has a particular codec and a particular packet length.

At operation 1514, the first Bluetooth radio stores the audio packet in the memory. For example, the audio packets are stored in a memory address accessible to the second Bluetooth radio.

At operation 1516, the computing device determines whether a switch from a receive mode to a transmit mode should occur. In an example, the computing device determines a trigger based on a number of idle time slots and/or the number of stored audio packets as described herein above in connection with FIGS. 9-10. If the switch should not occur, operation 1512 follows operation 1516 as indicated with the loop. Otherwise, operation 1518 follows operation 1516.

At operation 1518, the second Bluetooth radio has one or more audio packets stored in the memory to the second device over the second ACL link. In an example, the second Bluetooth radio accesses the audio packet from the memory spaces and transmits this audio packet without modification to the codec or the packet length. In another example, based on a determination that the PER associated with the second ACL link is larger than a predefined PER threshold, the second Bluetooth radio aggregates the audio packet with at least one other stored audio packet without modification to the codec and transmits the resulting audio packet over the second ACL link.

At operation 1520, the computing device determines whether a switch from a receive mode to a transmit mode should occur. In an example, the computing device determines a trigger based on a number of transmitted audio packets and/or the number of remaining stored audio packets as described herein above in connection with FIGS. 9-10. If the switch should not occur, operation 1518 follows operation 1518 as indicated with the loop. Otherwise, operation 1512 follows operation 1518 as indicated with the loop.

Figure 16:
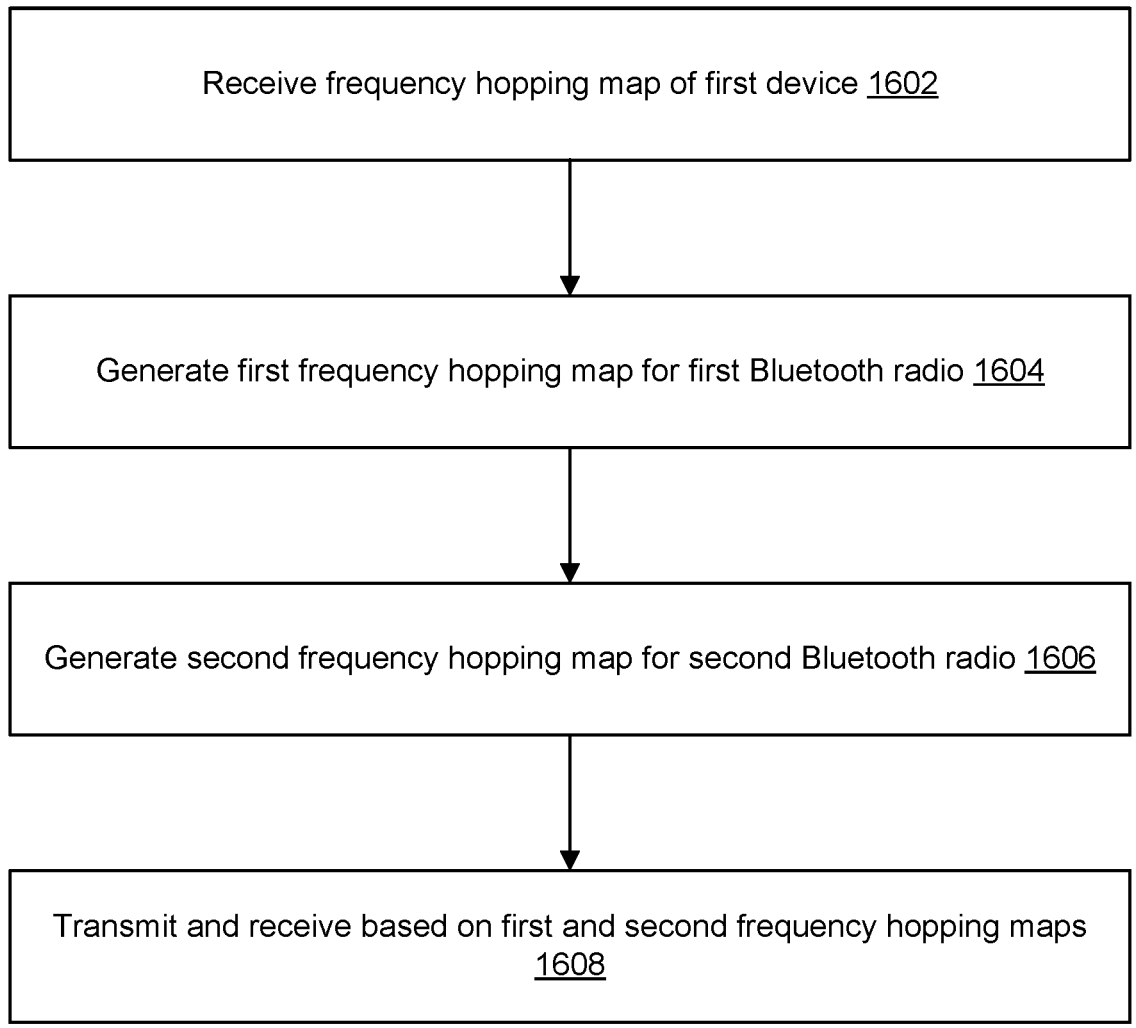
FIG. 16 illustrates an example flow for setting frequency hopping maps to support audio communications, according to embodiments of the present disclosure.

FIG. 16 illustrates an example flow for setting frequency hopping maps to support audio communications, according to embodiments of the present disclosure. The example flow may start at operation 1602, where the computing device receives a frequency hopping map of the first device. In an example, because the first device and the first Bluetooth radio are a primary device and a secondary device, respectively, in the first piconet, the first device dictates the frequency hopping map. Accordingly, the second Bluetooth radio receives the frequency hopping map from the first device.

At operation 1604, the computing device generates the first frequency hopping map based on the frequency hopping map of the first device. For example, the first Bluetooth radio copies the frequency hopping map to its local memory.

At operation 1606, the computing device generates the second frequency hopping map for the second Bluetooth radio based on the first frequency hopping map (or, equivalently, the frequency hopping map of the first device) and a predefined frequency band offset. For example, the computing device determines, from the first frequency hopping map, a first sequence of first frequency bands that the first Bluetooth radio is to use for its receptions and transmissions. The computing device generates a second sequence of second frequency bands such that each second frequency band is to be used synchronously with one of the first frequency bands and such that a second frequency band is at a number of frequency bands away from the corresponding first frequency band, where the number of frequency bands is equal to or larger than the predefined frequency band offset. The second sequence defines the second frequency hopping map. The second Bluetooth radio stores the second frequency hopping map in its local memory and transmits the second frequency hopping map to the second device.

At operation 1608, the computing device transmits and receives data based on the first frequency hopping map and the second frequency hopping map. In an example, each of the first Bluetooth radio and the second Bluetooth radio uses its frequency hopping map according to the specified sequence of frequency bands to use.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method including:
    pairing a first Bluetooth radio of a computing device to a mobile device;
    pairing a second Bluetooth radio of the computing device to a Bluetooth speaker of a vehicle, the first Bluetooth radio and the second Bluetooth radio being separate from each other;
    receiving, over a first extended Synchronous Connection Oriented (eSCO) link between the first Bluetooth radio and the mobile device, a first audio packet from the mobile device, the first audio packet received in a first time slot;
    storing the first audio packet in a memory of the computing device, the memory shared between the first Bluetooth radio and the second Bluetooth radio;
    receiving, over a second eSCO link between the second Bluetooth radio and the Bluetooth speaker, a second audio packet from the Bluetooth speaker, the second audio packets received in a second time slot that is parallel in time with the first time slot;
    transmitting, by the first Bluetooth radio over the first eSCO link, the second audio packet to the mobile device, the second audio packet transmitted in a third time slot;
    accessing, by the second Bluetooth radio, the first audio packet from the memory; and
    transmitting, by the second Bluetooth radio over the second eSCO link, the first audio packet to the Bluetooth speaker, the first audio packet transmitted in a fourth time slot that is parallel in time with the third time slot.

2. The computer-implemented method of claim 1, further including:
    receiving, over a first asynchronous connection-less (ACL) link between the first Bluetooth radio and the mobile device, a third audio packet from the mobile device;
    determining that a condition to transmit the third audio packet to the Bluetooth speaker is satisfied, the condition including at least one of:

(i) a number of time slots since last audio packet reception from the mobile device over the first ACL link exceeds a predefined number of time slots, or (ii) a number of audio packets received from the mobile device over the first ACL link exceeds a limit on a storable number of audio packets; and transmitting, by the second Bluetooth radio over a second ACL link between the second Bluetooth radio and the Bluetooth speaker, one or more audio packets to the Bluetooth speaker, wherein the one or more audio packets includes the third audio packet.

3. The computer-implemented method of claim 1, further including:

aligning a first clock of the first Bluetooth radio with a clock of the mobile device;

aligning a second clock of the second Bluetooth radio with the first clock, the first Bluetooth radio and the second Bluetooth radio associated with a same crystal oscillator; and setting an anchor point for the second Bluetooth radio, wherein the anchor point indicates a start of the second time slot to correspond to a start of the first time slot.

4. A device including:

a first Bluetooth radio storing first instructions that, upon execution, configure the first Bluetooth radio to:
 establish a first communication link with a first device, and
 receive, over the first communication link, a first audio packet from the first device; and a second Bluetooth radio storing second instructions that, upon execution, configure the second Bluetooth radio to:
 establish a second communication link with a second device,
 transmit, over the second communication link and based at least in part on timing of packet transmissions by the first Bluetooth radio, the first audio packet to the second device, and
 receive, over the second communication link, a second audio packet from the second device, wherein the first Bluetooth radio is further configured to transmit, over the first communication link and based at least in part on the timing, the second audio packet to the first device.

5. The device of claim 4, wherein the first Bluetooth radio stores additional instructions that, upon execution, configure the first Bluetooth radio to:
 align a first clock of the first Bluetooth radio with a clock of the first device, and
 wherein the second Bluetooth radio stores further instructions that, upon execution, configure the second Bluetooth radio to:
 align a second clock of the second Bluetooth radio with the first clock.

6. The device of claim 4, wherein the second Bluetooth radio stores additional instructions that, upon execution, configure the second Bluetooth radio to:
 set an anchor point indicating a transmission time slot in which the first audio packet is transmitted, the anchor point set based at least in part on another transmission time slot used by the first Bluetooth radio.

7. The device of claim 4, wherein the second Bluetooth radio stores additional instructions that, upon execution, configure the second Bluetooth radio to:
 receive, over the second communication link, the second audio packet from the second device, wherein the first audio packet and the second audio packet are received in parallel reception time slots, and wherein the first audio packet and the second audio packet are transmitted in parallel transmission time slot.

8. The device of claim 4, further comprising a memory shared between the first Bluetooth radio and the second Bluetooth radio, wherein the first Bluetooth radio stores additional instructions that, upon execution, configure the first Bluetooth radio to:
 store the first audio packet in the memory, the first audio packet having been encoded with a codec by the first device and stored as encoded; and
 wherein the second Bluetooth radio stores further instructions that, upon execution, configure the second Bluetooth radio to:
 access the first audio packet from the memory, wherein the first audio packet is transmitted as encoded.

9. The device of claim 4, wherein the first Bluetooth radio stores additional instructions that, upon execution, configure the first Bluetooth radio to:
 determine a first frequency band based on a first frequency hopping map, and
 transmit the second audio packet in the first frequency band over the first communication link to the first device, and
 wherein the second Bluetooth radio stores further instructions that, upon execution, configure the second Bluetooth radio to:
 determine a second frequency band for transmitting the first audio packet based on a second frequency hopping map, wherein the first audio packet is transmitted in the second frequency band over the second communication link to the second device, and wherein the second frequency hopping map is defined based at least in part on the first frequency hopping map.

10. The device of claim 9, wherein the device stores instructions that, upon execution, configure device to:
 generate the second frequency hopping map based at least in part on the first frequency hopping map and a frequency band offset, wherein the second frequency band is at a number of frequency bands away from the first frequency band, and wherein the number of frequency bands is equal to or larger than the frequency band offset.

11. The device of claim 4, further comprising:
a third wireless radio storing third instructions that, upon execution on the third wireless radio, configure the third wireless radio to exchange packets with a remote computer system.

12. The device of claim 11, further comprising:
a speaker;
a processor; and
a memory storing fourth instructions that, upon execution, configure the processor to:
 detect a wakeword from an audio input that corresponds to a user utterance;
 transmit utterance data from the audio input to the remote computer system through the third wireless radio;
 receive a response from the remote computer system through the third wireless radio; and
 present the response at the speaker, wherein the response is presented while transmissions of audio packets by the first Bluetooth radio and the second Bluetooth radio are paused.

13. A computer-implemented method including:
establishing, by a first Bluetooth radio of a computing device, a first communication link with a first device;
receiving, by the first Bluetooth radio over the first communication link, a first audio packet from the first device;
establishing, by a second Bluetooth radio of the computing device, a second communication link with a second device, the first communication link and the second communication link being of a same type;
transmitting, by the second Bluetooth radio over the second communication link and based at least in part on timing of packet transmissions by the first Bluetooth radio, the first audio packet to the second device,
receiving, by the second Bluetooth radio over the second communication link, a second audio packet from the second device; and
transmitting, by the first Bluetooth radio over the first communication link and based at least in part on the timing, the second audio packet to the first device.

14. The computer-implemented method of claim 13, wherein the first audio packet and the second audio packet are transmitted in parallel.

15. The computer-implemented method of claim 14, wherein the first audio packet and the second audio packet are transmitted in parallel based on an anchor point that indicates timing of transmission slots, and further comprising:
setting the anchor point based on a packet error rate (PER) associated with the second communication link.

16. The computer-implemented method of claim 13, further comprising:
determining that a number of time slots since last audio packet reception from the first device over the first communication link exceeds a predefined number of time slots, wherein the first audio packet is transmitted based on the number of time slots exceeding the predefined number.

17. The computer-implemented method of claim 13, further comprising:
determining that a number of audio packets received from the first device over the first communication link exceeds a limit on a storable number of audio packets, wherein the first audio packet is transmitted based on the number of audio packets exceeding the limit.

18. The computer-implemented method of claim 13, further comprising:
determining that a first condition to transmit audio packets received from the first device over the first communication link and stored in a memory is satisfied;
transmitting the audio packets to the second device over the second communication link;
sending a negative acknowledgement (NACK) message to the first device in response to a transmission of a third audio packet by the first device during the transmitting of the audio packets;
determining, after the transmitting of the audio packets, that a second condition to receive the third audio packet from the first device over the first communication link is satisfied; and
receiving the third audio packet from the first device over the first communication link.

19. The computer-implemented method of claim 13, further comprising:
aggregating the first audio packet with a third audio packet to form a fourth audio packet; and
transmitting the fourth audio packet to the second device over the second communication link.

20. The computer-implemented method of claim 13, further comprising:
determining that a number of time slots used by the first device for transmissions of audio packets within a transmit and receipt cycle exceeds a predefined number of time slots; and
presenting the audio packets at a speaker of the computing device without transmitting the audio packets to the second device.

* * * * *